US012752570B2

(12) United States Patent
Meersseman et al.

(10) Patent No.: US 12,752,570 B2
(45) Date of Patent: Oct. 6, 2026

(54) METHODS FOR MANUFACTURING A DECORATIVE PANEL, AND DECORATIVE PANELS

(71) Applicant: UNILIN, BV, Wielsbeke (BE)

(72) Inventors: Laurent Meersseman, Mont de l'Enclus (BE); Christophe Naeyaert, Jabbeke (BE); Jan De Rick, Geraardsbergen (BE); Benny Schacht, Vlamertinge (BE)

(73) Assignee: UNILIN BV, Wielsbeke (BE)

( * ) Notice: Subject to any disclaimer, the term of this patent is extended or adjusted under 35 U.S.C. 154(b) by 218 days.

(21) Appl. No.: 18/559,177

(22) PCT Filed: May 9, 2022

(86) PCT No.: PCT/IB2022/054267

§ 371 (c)(1),
(2) Date: Nov. 6, 2023

(87) PCT Pub. No.: WO2022/238858

PCT Pub. Date: Nov. 17, 2022

(65) Prior Publication Data

US 2024/0239132 A1 Jul. 18, 2024

Related U.S. Application Data

(60) Provisional application No. 63/310,843, filed on Feb. 16, 2022, provisional application No. 63/221,596,
(Continued)

(30) Foreign Application Priority Data

Aug. 6, 2021 (EP) .................................... 21190114
Dec. 21, 2021 (EP) .................................... 21216546

(51) Int. Cl.
*B29C 48/00* (2019.01)
*B29C 48/07* (2019.01)
(Continued)

(52) U.S. Cl.
CPC .............. *B44C 5/04* (2013.01); *B29C 48/002* (2019.02); *B29C 48/0022* (2019.02);
(Continued)

(58) Field of Classification Search
CPC .... B29C 48/002; B29C 48/0022; B29C 48/07
See application file for complete search history.

(56) References Cited

U.S. PATENT DOCUMENTS 4,772,500 A 9/1988 Stroppiana
8,071,193 B2 12/2011 Windmoller
(Continued)

FOREIGN PATENT DOCUMENTS

CN 115434488 A 12/2022
EP 1290291 A1 3/2003
(Continued)

OTHER PUBLICATIONS

Extended European Search Report from corresponding EP Application No. 21190114.5, Feb. 11, 2022.
(Continued)

*Primary Examiner* — Seyed Masoud Malekzadeh
(74) *Attorney, Agent, or Firm* — Workman Nydegger

(57) ABSTRACT

A method is provided for manufacturing a decorative panel. The panel includes a substrate and a decorative top layer. The substrate is a mineral containing substrate and/or a thermoplastic material containing substrate. The substrate and/or decorative top layer is obtained from a larger material by means of a dividing operation. The panel includes at at least one and preferably at both upper edges of a pair of opposite side edges a lower edge area. The lower edge area
(Continued)

is obtained prior to or during said dividing operation. Decorative panels are obtainable through such a method.

19 Claims, 14 Drawing Sheets

Related U.S. Application Data filed on Jul. 14, 2021, provisional application No. 63/187,510, filed on May 12, 2021.

(51) Int. Cl.

| | |
|---|---|
| ***B44C 1/24*** | (2006.01) |
| ***B44C 5/04*** | (2006.01) |
| ***E04F 15/10*** | (2006.01) |
| *B29K 101/12* | (2006.01) |
| *B29L 31/00* | (2006.01) |
| *E04F 15/02* | (2006.01) |

(52) U.S. Cl.

CPC ................ *B29C 48/07* (2019.02); *B44C 1/24* (2013.01); *E04F 15/105* (2013.01); *E04F 15/107* (2013.01); *B29K 2101/12* (2013.01); *B29L 2031/722* (2013.01); *B29L 2031/732* (2013.01); *E04F 15/02038* (2013.01); *E04F 2201/023* (2013.01); *E04F 2201/043* (2013.01)

(56) References Cited

U.S. PATENT DOCUMENTS

| | | | | |
|---|---|---|---|---|
| 8,741,085 | B2 * | 6/2014 | Anspach | B26F 1/40 264/153 |
| 9,650,483 | B2 | 5/2017 | Hannig | |
| 10,233,655 | B2 | 3/2019 | Meersseman et al. | |
| 2008/0138560 | A1 | 6/2008 | Windmoller | |
| 2011/0041989 | A1 * | 2/2011 | Anspach | E04F 15/10 264/163 |
| 2012/0240502 | A1 | 9/2012 | Wilson et al. | |
| 2015/0368421 | A1 | 12/2015 | Hannig | |
| 2020/0056380 | A1 | 2/2020 | Dai et al. | |
| 2020/0377711 | A1 | 12/2020 | Dai et al. | |
| 2021/0032879 | A1 | 2/2021 | Meersseman et al. | |
| 2021/0363759 | A1 | 11/2021 | Baert et al. | |
| 2022/0259869 | A1 * | 8/2022 | Boucké | B29C 48/0022 |
| 2023/0211535 | A1 | 7/2023 | Fang et al. | |

FOREIGN PATENT DOCUMENTS

| | | | |
|---|---|---|---|
| EP | 1938963 | A1 | 7/2008 |
| EP | 2905135 | A2 | 8/2015 |
| JP | 2005009140 | A | 1/2005 |
| WO | 9747834 | A1 | 12/1997 |
| WO | 2006066776 | A2 | 6/2006 |
| WO | 2011141849 | A2 | 11/2011 |
| WO | 2012004701 | A2 | 1/2012 |
| WO | 2014117887 | A1 | 8/2014 |
| WO | 2020025129 | A1 | 2/2020 |
| WO | 2021018918 | A1 | 2/2021 |

OTHER PUBLICATIONS

Extended European Search Report from corresponding EP Application No. 21216546.8, Jun. 22, 2022.

International Search Report from corresponding PCT Application No. PCT/IB2022/054267, Nov. 7, 2022.

* cited by examiner

METHODS FOR MANUFACTURING A DECORATIVE PANEL, AND DECORATIVE PANELS

BACKGROUND

This invention relates to methods for manufacturing decorative panels, as well as to decorative panels obtainable through such methods. The invention is in the first place aiming at floor panels, but may be put to practice with wall panels, ceiling panels or furniture panels as well.

More particularly, the invention relates to floor panels of the type which is at least composed of a substrate and a decorative top layer forming a decorative surface, wherein said top layer comprises a motif. Above said motif a transparent or translucent synthetic material layer may be provided, which layer then forms part of said top layer.

In particular, the present invention relates to floor panels of the type which, at two or more opposite edges, comprises coupling means or coupling parts, with which two of such floor panels can be coupled at the respective edges, such that they are locked together in a horizontal direction perpendicular to the respective edge and in the plane of the floor panels, as well as in a vertical direction perpendicular to the plane of the floor panels. Such floor panels can be applied for composing a so-called floating floor covering, wherein the floor panels are interconnected at their edges, however, are lying freely on the underlying floor.

From WO 97/47834, EP 1 290 291 and WO 2006/066776, laminate floor panels are known for forming a floating floor covering. However, laminate floor panels show the disadvantage that they mostly are provided with a moisture-sensitive substrate, namely MDF or HDF (Medium Density Fiberboard or High Density Fiberboard), and that the top layer provided on said substrate, when the floor covering is in use, leads to the development of ticking noises. From EP 1 290 291, it is known to provide laminate floor panels with a bevelled edge portion that is formed by removing a material portion from the edge of the floor panel, to thereby expose a portion of the core material. From WO 2006/06676 it is known to form bevelled edge portions by compressing the core material, such that the top layer extends uninterruptedly from the global surface of the panel to and over the bevelled edge portion.

From EP 1 938 963, vinyl-based floor panels are known for forming such floating floor covering. Such vinyl-based floor panels mostly have a thickness of 3 to 5 millimeters and have a high material density. WO 2011/141,849 and WO 2014/117,887 disclose decorative panels having a foamed core. WO 2012/004701 discloses that vinyl-based floor panels may be provided with a bevelled edge portion as well, either by machining away a material portion and exposing a layer underlaying the motif, or by deforming the surface of the panel such that the motif extends also over the bevelled edge portion.

SUMMARY

The present invention relates to an alternative method of manufacturing a decorative panel, which in particular is intended as a floor panel for forming a floating floor covering. According to various preferred embodiments of the invention, also a solution is offered for one or more problems with the floor panels and their method of manufacture of the state of the art.

To this aim, the invention is a method for manufacturing a decorative panel, wherein said panel comprises a substrate and a decorative top layer, wherein said substrate is a mineral containing substrate and/or a thermoplastic material containing substrate, wherein said substrate and/or decorative top layer is obtained from a larger material by means of a dividing operation, with as a characteristic that said panel comprises at at least one and preferably at both upper edges of a pair of opposite side edges a lower edge area, wherein said lower edge area is obtained prior to or during said dividing operation. Obtaining the lower edge area while the decorative panel material still forms part of a larger material allows for a more fluent production process. For example any bulging out or unwanted deformation of the larger material due to the forming of the lowered edge area can be concentrated in a part of the larger material which is destined to be removed in subsequent steps, for example in said dividing operation or afterwards. Further the method of the invention allows to position the dividing operation with respect to said upper edges having said lower edge area, e.g. such that opposite side edges have a lower edge area of predetermined size or shape. Further, in the cases where such larger material contains two or more decorative panels, lower edge areas at two or more upper edges of said two or more decorative panels can be formed in the same operation. In such case the lower edge areas can be made to resemble closely with limited effort. In light of the invention, and throughout the description, the term “cut edge” indicates the edge along which a slab of substrate material is physically cut from a larger material, e.g. a larger slab of substrate material, by means of a dividing operation. The term “upper edge” relates to the edge that is formed on the upper side of the panel, and along which the lower edge area is adjacently formed.

Preferably, said dividing operation comprises performing a cutting operation releasing at least said substrate from said larger material at least two opposite side edges.

Preferably, said cutting operation forms opposite cut edges for releasing said at least two opposite side edges, wherein said opposite cut edges are positioned at a mutually different distance from said upper edges of said panel. The different distances allow for formation of profiled edges horizontally extending differently beyond the respective upper edge, with a minimized material loss.

Preferably, said dividing operation comprises a cutting operation, more particularly a punching operation, namely an operation in which a stationary, i.e. non-rotating, cutting blade or knife is pressed down to, into and through the material to be cut.

The lower edge area can be formed using one or more of a variety of different methods, of which here below some important possibilities are described without desiring to be exhaustive.

According to a first possibility, said lower edge area is formed simultaneously with, i.e. during said dividing operation, or practically simultaneously with said dividing operation. In this manner, a very accurate positioning of the cut edge relative to the upper edge of the panel can be obtained. With the forming tools being engaged with the larger material at least during part of said dividing operation, the respective lowered edge area is considered to be formed simultaneously with or during the dividing operation, and the lowered edge area is considered to be obtained during said dividing operation. With the forming tools engaging with the larger material while the larger material is within the dividing apparatus and/or aligned with the operational position of the cutting tools, and disengaging prior to the engagement of the cutting tools with said larger material, the respective lowered edge area is considered to be formed, at least in part, prior to, but practically simultaneously with said dividing operation. In light of the invention, and throughout the description, the terms "simultaneously with" and "during" in relation to forming the lower edge area and the dividing operation are to be interpreted in that said forming the lower edge area and the dividing operation are performed preferably at the same time and/or are at least partially overlapping. The term "practically simultaneously with" herein indicates that a slight time gap between the dividing operation and the forming of the lower edge area is allowed, however while still obtaining a very accurate positioning of the cut edge relative to the upper edge of the panel. Such a slight time gap may constitute a gap of less than 1.0 second, preferably of less than 0.9 seconds, of less than 0.8 seconds, of less than 0.7 seconds, of less than 0.6 seconds, or of less than 0.5 seconds. Such a slight time gap may also constitute a gap of less than 10% of the duration of the forming the lower edge area and/or of the dividing operation, preferably of less than 9%, less than 8%, 7%, 6%, 5%, 4%, 3%, 2%, or less than 1%.

According to a practical embodiment, for example of said first possibility, said dividing operation comprises:

- providing said larger material in a dividing apparatus;
- indenting said larger material at the location of said upper edges in order to at least partially form said lower edge area;
- releasing said substrate and/or said decorative top layer from said larger material by means of a cutting operation with a cutting tool, for example by means of a knife that is forced in and through said larger material.

Preferably, said indenting is executed by means of a mold or mold portions that press down on said substrate and/or said decorative top layer. Said mold or mold portions may be engaged with said substrate and/or said decorative layer at the start of said cutting operation, and are preferably still engaged at the end of said cutting operation. With the mold or mold portions being engaged with the larger material at least during part of said cutting operation, the respective lowered edge area is formed, at least in part, simultaneously with or during the dividing operation. In this manner the material to be cut may be kept stationary, and an accurate positioning of the cut edge may be obtained. Preferably, said mold or mold portions are movable with respect to said cutting tool. Preferably, said mold or mold portions are substantially at standstill during the cutting operation, i.e. while the cutting tool is moved into and through said substrate and/or decorative layer.

According to a second possibility, said lower edge area is formed in line with, preferably prior to, said cutting operation releasing at least said substrate from said larger material at at least two opposite edges. The inline operation allows for an accurate positioning of the cutting operation with relation to the lower edge areas or the final upper edges of the decorative panels to be obtained.

In accordance with said second possibility, the formation of the lower edge area is preferably formed using a continuous forming or deforming operation. Preferably said lower edge area is formed by means of one or more structured rollers and/or by means of one or more moving belts indenting said larger material. Such operation can fluently be arranged in-line with a continuous operation, for example with an extrusion and lamination operation for forming the larger material. The rollers and/or belts may form the lower edge area while the larger material is fed passed the respective equipment.

In accordance with said second possibility, said cutting operation is preferably performed by means of a plurality of, preferably rotating, cutting tools. The cutting tools may be saw blades or rotating knives. Preferably, said cutting tools are positioned to form opposite cut edges at predefined distances from said upper edges of said decorative panel.

The position of said cutting tools may be controllable and/or controlled on the basis of an upstream portion of said larger material. The cutting tools may for example be controlled to attain said predefined distances between a cut edge and a respective upper edge. The upstream portion of said larger material may be recorded by means of optical or tactile sensors, such as by means of one or more camera's or feeling gauges. The upstream portion preferably comprises a portion within or at a fixed distance of an available lower edge area and/or upper edge to be obtained. The upstream portion may be detectable because of its relief, in the case of a lower edge area for example because it extends beneath the global surface of the larger material, or because of its decoration or marking.

As already mentioned above, preferably the method, in accordance with said first or second possibility, further comprises a step of providing a larger material comprising said substrate and/or decorative top layer by means of a continuous operation preferably including one or more extrusion operations, scattering operations, pressing operations and/or lamination operations.

Preferably, in accordance with said second possibility, said lowered edge area and said cutting operation is performed in line with said step of providing said larger material.

According to a special embodiment of said first or second possibility, said lowered edge area is formed by indenting material at an edge of a pre-machined portion of said larger material. By means of pre-machining a portion of material can be taken away at the location where the lower edge area is to be formed. In this manner less material must be displaced to form the lower edge area, and a more accurate result may be obtained with less power needed for the deformation. Preferably, said pre-machined portion is performed from the top of said larger material at least into said substrate. Preferably, said pre-machined portion comprises an undercut, i.e. a portion available vertically beneath a remaining top surface portion of said larger material.

According to said second possibility, said method may further comprise a step of providing a larger material comprising at least said substrate, wherein said substrate is provided with lowered substrate areas at the location of said lower edge area, prior to application of said decorative top layer to said substrate. According to a variant, said method may further comprise a step of providing a larger material comprising at least said substrate, wherein a decorative top layer is applied to said substrate, wherein said decorative top layer or a portion thereof comprises a structure prior to application thereof to said substrate. Preferably, said structure of said top layer or the respective portion thereof includes said lowered edge area. Preferably, at least in case of said variant, said decorative top layer comprises a plurality of layers and comprises a motif. A layer underlaying said motif may comprise thinned portions or openings basically corresponding to the structure of said lowered edge area. Such thinned portions or openings may limit the needed deformation and power to obtained the lowered edge area or areas. Preferably, at least two, and preferably all of said plurality of layers are laminated to each other, prior to their application to said substrate.

According to a third possibility, said method further comprises a step of providing a larger material comprising said substrate and/or decorative top layer by means of a continuous or discontinuous pressing operation wherein a plurality of prefabricated layers are adhered to each other. Preferably, said lower edge area is formed simultaneously with said pressing operation. Preferably said pressing operation is a discontinuous pressing operation, for example by means of a single daylight or multiple daylight press. Such press may comprise at least one pressing element associated to each larger material to be pressed, in the case of a single daylight press, at least a pressing element for coming into contact with the decorative top layer, and potentially a pressing element for coming into contact with the bottom of the larger material to be pressed. Such press element, especially the press elements coming into contact with the decorative top layer, may be structured, for example it may concern a structured press plate or a structured foil. The pressing operation may be a heated press operation, potentially followed by a cooling operation under pressure, preferably in the same or in a separate, but similar press.

According to the method of said third possibility, preferably at least one of said prefabricated layers may comprise thinned sections and/or removed sections, preferably at least at the location where said lower edge area is obtained or to be obtained. Such thinned portions or removed sections may limit the needed deformation and power to obtained the lowered edge area or areas. Preferably, said at least one of said prefabricated layers is a thermoplastic layers from which sections have been removed by means of a cutting operation, more particularly a punching operation. Preferably, said at least one of said prefabricated layers is a one-piece layer.

In general, independent from the fact whether one of the above possibilities are used, said larger material is preferably provided with a reference portion prior to said dividing operation. Such reference portion may aid in positioning the larger material with respect to further operations. Preferably, said reference portion is used to align the larger material to the dividing operation or part thereof, more particularly to one or more cuts performed therein, or vice-versa, namely wherein said reference portion is used to align one or more cutting tools performing said cuts to the larger material, or both. For example, said aligning may be such that the lower edge area is parallel to one or more of the cuts performed in said dividing operation.

Said reference portion may comprises an indentation or excavation provided in the bottom of said larger material. According to a variant or in combination with the aforesaid, said reference portion may comprise an edge of said larger material. According to another variant, said reference portion comprises a visual or tactile marking available at the side of said larger material that comprises said lower edge area.

Preferably, said reference portion is provided at a predefined distance from an upper edge of said panel.

Preferably, said reference portion cooperates with a stop or guiding tool in said dividing operation. The reference portion may therefore be performed as an excavation for engagement with a portion of a stop or guiding tool, be it in said dividing operation or in another operation.

Preferably, in accordance with the invention, said decorative top layer continuous uninterruptedly from on the global upper surface of said panel to and over said lower edge area.

Preferably, said lower edge areas are formed as straight or curved chamfers. According to a variant the lower edge areas may be formed with an L-shape, i.e. with a horizontal, or substantially horizontal bottom adjoining the upper edge and an upwardly extending wall portion at the proximal side of the lower edge area.

Preferably, said lower edge areas are available at both edges of a pair of opposite upper edges, wherein said lower edge areas at opposite upper edges mutually extend to a same depth and/or over a same horizontal distance, as measured perpendicularly to said upper edge. In the case of lower edge areas formed as straight or curved chamfers, a so-called V-groove may be formed when two lower edge areas of similar panels are adjacent in a covering formed from such decorative panels.

For example in the case of L-shaped lower edge areas, they may be available at one or both edges of a pair of opposite upper edges. With an L-shaped lower edge area an imitation of a grout line, rubber or asphalt joint may be achieved.

Preferably, at least two substrates and/or top layers for respective panels are obtained or obtainable from said larger material. Preferably the larger material has a practically endless web-shape or a limited length slab-shape, wherein at least in one direction, for example the width direction of the web or slab, four or more rectangular panels can be obtained, wherein the width of the panels is preferably oriented in the same direction as the width of the web or slab.

As is clear from the above, preferably said substrate at the location of said lower edge area is compressed or deformed.

In general, the substrate and/or decorative top layer of the decorative panel of the invention, preferably show one or a combination of two or more of the following properties:

- the substrate and/or the decorative layer comprise a foamed material layer, for example a closed cell foam of a thermoplastic material such as PVC. The availability of a foamed material layer is convenient for example in case the lower edge area is formed at least in part by means of compression or deformation. The cell walls may be collapsed to create said lower edge area or a portion thereof;
- the substrate and/or the decorative layer comprise one or more voids, at least at a position vertically underneath said lower edge area. Said voids may be formed by the cells of a foamed material layer and/or may be formed by means of removing material from an otherwise solid material layer and/or may be formed as open or closed chambers within a material layer of said substrate;
- the substrate and/or the decorative layer comprise material having a shore hardness A lower than 80, and preferably higher than 20. A material layer having a relatively low hardness may be more easily deformable in order to create at least a portion of said lower edge portion. Preferably said material is available in the panel at least at a position immediately below said decorative layer.

Said substrate may comprise at least one of an Magnesiumoxychloride or Magnesiumoxysulphate containing board or layer.

Alternatively, or in combination with the above, said substrate may comprise at least a thermoplastic material containing board or layer, preferably a filled synthetic composite comprising thermoplastic material and filler material, preferably mineral filler materials, such as sand, talcum, chalk or other forms of $CaCO_3$.

Preferably, said decorative top layer comprises a motif preferably formed by a printed pattern or a wood veneer. Said decorative top layer may comprise a carrier layer upon which said printed pattern is provided and a transparent wear layer applied on top of said printed pattern. Said carrier layer may be a thermoplastic foil, preferably a PVC foil, a paper layer or a wood veneer. Preferably, said wear layer is a thermoplastic foil.

In accordance with a special embodiment, said decorative top layer comprises from bottom to top at least a backing layer, a printed carrier layer and a transparent wear layer. Preferably said backing layer forms the majority of the thickness T of said decorative top layer, or at least 45 percent thereof. Said decorative top layer is preferably assembled from said backing layer, printed carrier layer and wear layer by means of thermal lamination, i.e. preferably in the absence of separate glue layers in between said layers. Preferably said decorative top layer, or at least the bottom layer thereof, is connected to said substrate by means of thermal lamination as well, i.e. in the absence of a separate glue layer. However it is not excluded that said decorative top layer, or at least the bottom layer thereof, is glued to said substrate.

In the cases where said decorative layer comprises a backing layer, said backing layer is preferably a thermoplastic layer, preferably of soft PVC, namely PVC with more than 10 phr plasticizer, and/or of a thermoplastic foamed material, e.g. foamed PVC.

In general, with the exception of the first possibility mentioned above for forming said lower edge area, said lower edge area is preferably formed by means of one or more structured rollers and/or by means of one or more belts indenting said larger material.

As already mentioned above, preferably the methods of the invention comprise a step of providing a larger material comprising said substrate and/or decorative top layer by means of a continuous operation preferably including one or more extrusion operations, scattering operations, pressing operations and/or lamination operations. Preferably the step of providing a larger material at least comprises one or more extrusion operations and a lamination operation, or at least one or more scattering operations and a lamination operation. During the lamination operation multiple layers may be laminated, at once, subsequently or in any other sequence.

Preferably, the larger material comprises a printed pattern of adjacent rectangular and oblong panels or tiles. For example, a printed pattern applied to a carrier layer, such as a thermoplastic foil. Preferably said lower edge areas are at least available in between adjacent longitudinal edges of said panels or tiles. The longitudinal edges of said panels or tiles may be directed in the feed direction of said continuous operation. According to a variant, the longitudinal edges of said panels are directed transversely to said feed direction. In the latter case the possible stretching of the printed pattern can be controlled in an enhanced manner and the forming operation for said lower edge areas can be executed more accurately, as well as the dividing operation. In the cases where a printed thermoplastic foil is used, for example a printed PVC foil may be used. Such PVC foil may be of the soft type, or of the semi-rigid or rigid type. A rigid type PVC foil, i.e. a PVC foil comprising 0 to 5 phr of plasticized is preferred in order to minimize possible elongation of the PVC foil during processing, e.g. the lamination.

Preferably, the larger material is a flat web shaped substrate material, for example having a width W of 1 to 2.1 meter, preferably about 1.3 meter, and, preferably, a thickness T2 of 2 to 7 mm, by preference of 3 to 6 mm, more by preference of 3 to 5 mm, even more by preference of 3.5 to 4.5 mm, for example about 4 mm. The flat web shaped substrate material is preferably provided in continuous length, for example by means of an extrusion operation.

The orientation of rectangular and oblong panels with their longitudinal edges transversely to the feeding direction in the lamination operation forms an inventive aspect of the present invention as well, independent from the fact whether or not lower edge areas are available or being formed. This independent aspect can be defined as a method for manufacturing a decorative panel, wherein said panel comprises a substrate and a decorative top layer, wherein said substrate is a mineral containing substrate and/or a thermoplastic material containing substrate, wherein said substrate and decorative top layer is obtained from a larger material by means of a dividing operation, with as a characteristic that said method comprises a lamination operation for providing at least a part of said decorative top layer on said substrate, wherein said lamination operation is a continuous operation wherein the respective part of said decorative top layer is fed to the lamination operation in a feeding direction, and wherein said panel is rectangular and oblong with the longitudinal edges thereof being directed transversely to said feeding direction. Preferably said method further comprises an embossing operation and/or a forming operation for forming lower edge areas.

Performing the dividing operation to divide the larger material into panels in a direction transversely to the feeding direction of the larger material forms an inventive aspect of the present invention as well, independent from the fact whether or not lower edge areas are available or being formed. This independent aspect can be defined as a method for manufacturing a decorative panel, wherein said panel comprises a substrate and a decorative top layer, wherein said substrate is a mineral containing substrate and/or a thermoplastic material containing substrate, wherein said substrate and/or decorative top layer is obtained from a larger material by means of a dividing operation, and wherein said dividing operation is performed to divide the larger material into slabs comprising a single panel or more than one panel, in a direction transversely to the feeding direction of said larger material.

By preference, said slabs comprising more than one panel are further divided into slabs comprising a single panel by means of a secondary dividing operation.

According to some embodiments, said panel comprises at least one and more by preference at both upper edges of a pair of opposite side edges a lower edge area, wherein said lower edge area is obtained prior to said dividing operation, during said dividing operation, or practically simultaneously with said dividing operation. More by preference, said lower edge area is obtained during said dividing operation or practically simultaneously with said dividing operation. In this manner, a very accurate positioning of the cut edge relative to the upper edge of the panel can be obtained.

Obtaining the lower edge area while the decorative panel material still forms part of a larger material allows for a more fluent production process. For example any bulging out or unwanted deformation of the larger material due to the forming of the lowered edge area can be concentrated in a part of the larger material which is destined to be removed in subsequent steps, for example in said dividing operation or afterwards.

Further the method of the invention allows to position the dividing operation with respect to said upper edges having said lower edge area, e.g. such that opposite side edges have a lower edge area of predetermined size or shape. Further, in the cases where such larger material or such slab contains two or more decorative panels, lower edge areas at two or more upper edges of said two or more decorative panels can be formed in the same operation. In such case the lower edge areas can be made to resemble closely with limited effort.

Preferably, said dividing operation comprises performing a cutting operation with a cutting tool, releasing at least said substrate from said larger material at least two opposite side edges.

Preferably, said cutting operation forms opposite cut edges for releasing said at least two opposite side edges, wherein said opposite cut edges are positioned at a mutually different distance from said upper edges of said panel. The different distances allow for formation of profiled edges horizontally extending differently beyond the respective upper edge, with a minimized material loss.

In some embodiments, said dividing operation comprises a stationary cutting operation, more particularly a punching operation, namely an operation in which a stationary, i.e. non-rotating, cutting blade or knife is pressed down to, into and through the material to be cut, and which is transversely oriented with respect to the feeding direction of said larger material. In some embodiments, said dividing operation comprises a non-stationary cutting operation, namely an operation in which a non-stationary, i.e. a rotating, roller is operated, said roller comprising a knife-shaped protrusion, which protrusion is brought intermittently into engagement with the material to be cut through the rotation of the roller, and which is transversely oriented with respect to the feeding direction of said larger material.

In some embodiments, the cutting blade or knife, or the knife-shaped protrusion, may comprise a cutting edge which is substantially parallel to the plane of the larger material to be divided. In some embodiments, the cutting blade or knife, or the knife-shaped protrusion, may have a cutting edge which is not parallel to the plane of the larger material to be divided. Preferably, the cutting blade or knife, or the knife-shaped protrusion, may have a cutting edge which is slightly angled with respect to the plane of the larger material. In particular, the cutting edge may be angled over at least 0.10° with respect to the plane of the larger material. More in particular, the cutting edge may be angled over at least 0.25° with respect to the plane of the larger material, over at least 0.50°, 0.75°, 1.00°, 1.25°, 1.50°, 1.75°, 2.00°, 2.25°, or over at least 2.50° with respect to the plane of the larger material.

According to some embodiments, said secondary dividing operation comprises a cutting operation with a cutting tool, releasing at least said substrate from said slab comprising more than one panel at least two opposite side edges, wherein said opposite cut edges are positioned at a mutually different distance from said upper edges of said panel.

According to some embodiments, said secondary dividing operation comprises a stationary cutting operation, more particularly a punching operation, namely an operation in which a stationary, i.e. non-rotating, cutting blade or knife is pressed down to, into and through the slab comprising more than one panel.

According to some embodiments, said secondary dividing operation comprises a non-stationary cutting operation, more particularly a sawing operation, namely an operation in which a rotating cutting blade or knife is moved into and through the slab comprising more than one panel.

According to a practical embodiment, for example, said dividing operation comprises:

- providing said larger material in a dividing apparatus;
- indenting said larger material at the location of said upper edges in order to at least partially form said lower edge area;
- releasing said substrate and/or said decorative top layer from said larger material by means of a cutting operation with a cutting tool, for example by means of a cutting blade or knife which is pressed down to, into and through said larger material, or by means of a roller comprising a knife-shaped protrusion, which protrusion is brought intermittently into engagement with the larger material through rotation of said roller.

According to some embodiments, said lower edge area is obtained by indenting said larger material at the location of said upper edges by means of a mold or mold portions.

Said mold or mold portions may be engaged with said substrate and/or said decorative layer at the start of said dividing operation, and are preferably still engaged at the end of said dividing operation. With the mold or mold portions being engaged with the larger material at least during part of said dividing operation, the respective lowered edge area is formed, at least in part, simultaneously with or during the dividing operation. In this manner the material to be cut may be kept stationary, and an accurate positioning of the cut edge may be obtained.

Preferably, said mold or mold portions are movable with respect to said cutting tool. Preferably, said mold or mold portions are substantially at standstill during the cutting operation, i.e. while the cutting tool is moved into and through said substrate and/or decorative layer.

In particular where the cutting tool concerns a cutting blade or knife, the mold or mold portions may be formed together with the cutting blade or knife as a singular entity. Alternatively, the mold or mold portions may be formed as a separate entity from the cutting blade or knife, wherein the cutting blade or knife is moveable with respect to the mold or mold portions.

In particular where the cutting tool concerns a roller comprising a knife-shaped protrusion, the mold or mold portions may be formed as secondary protrusions on the roller, comprised on at least one side, preferably on two sides, of the knife-shaped protrusion.

According to some embodiments, said lower edge area is formed in line with, preferably prior to, said cutting operation releasing at least said substrate from said larger material at least two opposite edges. The inline operation allows for an accurate positioning of the cutting operation with relation to the lower edge areas or the final upper edges of the decorative panels to be obtained.

In accordance with said embodiments, the formation of the lower edge area is preferably formed using a continuous forming or deforming operation. Preferably said lower edge area is formed by means of one or more structured rollers and/or by means of one or more moving belts indenting said larger material. Such operation can fluently be arranged in-line with a continuous operation, for example with an extrusion and lamination operation for forming the larger material. The rollers and/or belts may form the lower edge area while the larger material is fed passed the respective equipment.

As mentioned above, preferably the methods of the invention comprise a step of providing a larger material comprising said substrate and/or decorative top layer by means of a continuous operation preferably including one or more extrusion operations, scattering operations, pressing operations and/or lamination operations. Preferably the step of providing a larger material at least comprises one or more extrusion operations and a lamination operation, or at least one or more scattering operations and a lamination operation. During the lamination operation multiple layers may be laminated, at once, subsequently or in any other sequence.

In some embodiments, said decorative top layer continues uninterruptedly from on the global upper surface of said panel to and over said lower edge area. Said lower edge areas at opposite upper edges may mutually extend to a same depth and/or over a same horizontal distance, as measured perpendicularly to said upper edge. Preferably, said substrate at the location of said lower edge area may be compressed or deformed.

According to a further or another embodiment, said substrate and/or decorative top layer may show one or a combination of two or more of the following properties:

- the substrate and/or the decorative layer comprise a foamed material layer, for example a closed cell foam of a thermoplastic material such as PVC;
- the substrate and/or the decorative layer comprise one or more voids, at least at a position vertically underneath said lower edge area;
- the substrate and/or the decorative layer comprise material having a shore hardness A lower than 80, and preferably higher than 20.

Preferably, said substrate may comprise at least a thermoplastic material containing board or layer, preferably a filled synthetic composite comprising thermoplastic material and filler material, preferably mineral filler materials, such as sand, talcum, chalk or other forms of CaCO3, and in that said decorative top layer comprises a motif preferably formed by a printed pattern or a wood veneer

BRIEF DESCRIPTION OF THE DRAWINGS

With the intention of better showing the characteristics according to the invention, in the following, as an example without limitative character, several embodiments are described, with reference to the accompanying drawings, wherein FIG. 1 schematically illustrates some steps in a method in accordance with the invention.

DETAILED DESCRIPTION OF VARIOUS EMBODIMENTS

Figure 1:
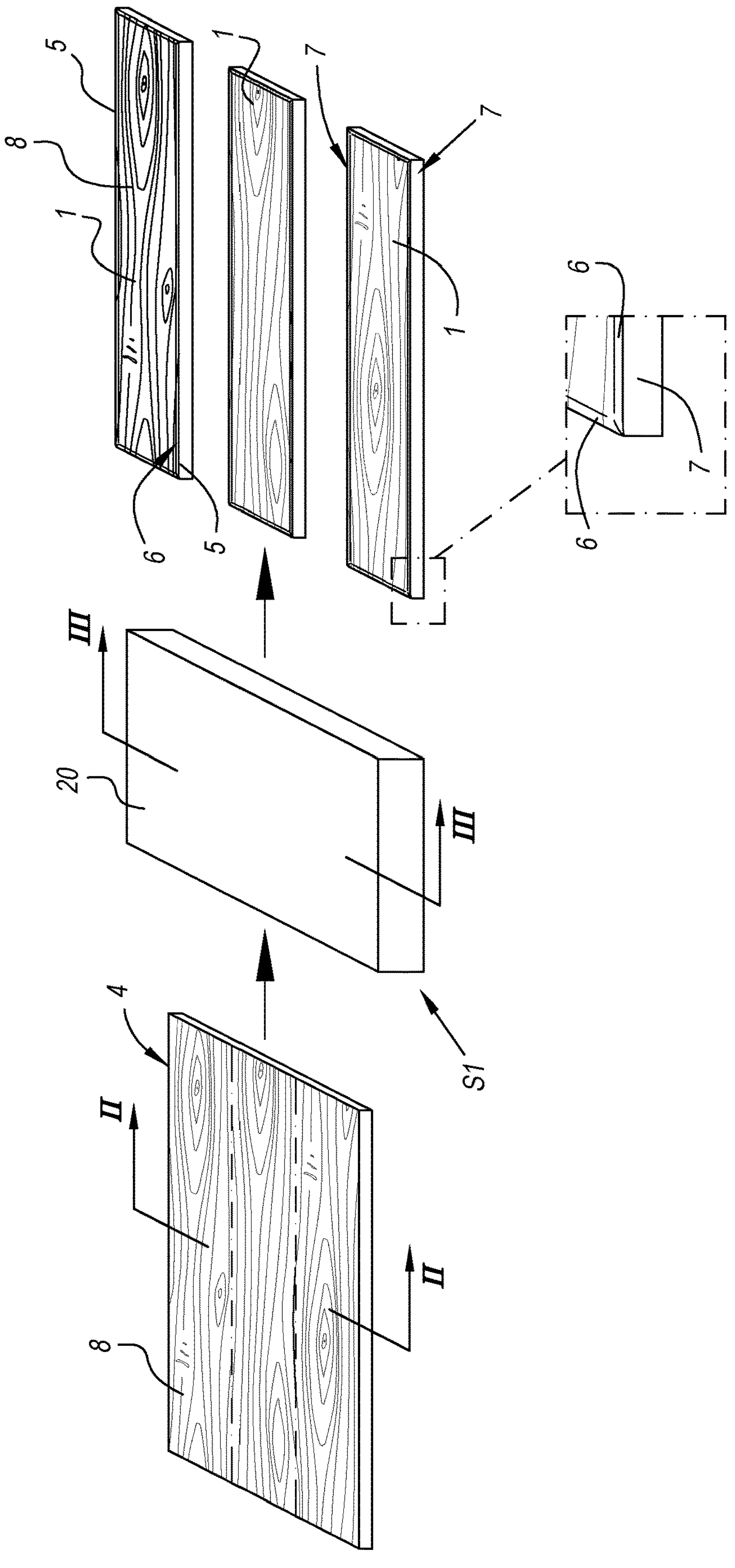

FIG. 1 illustrates some steps in a method for manufacturing a decorative panel 1.

Figure 2:
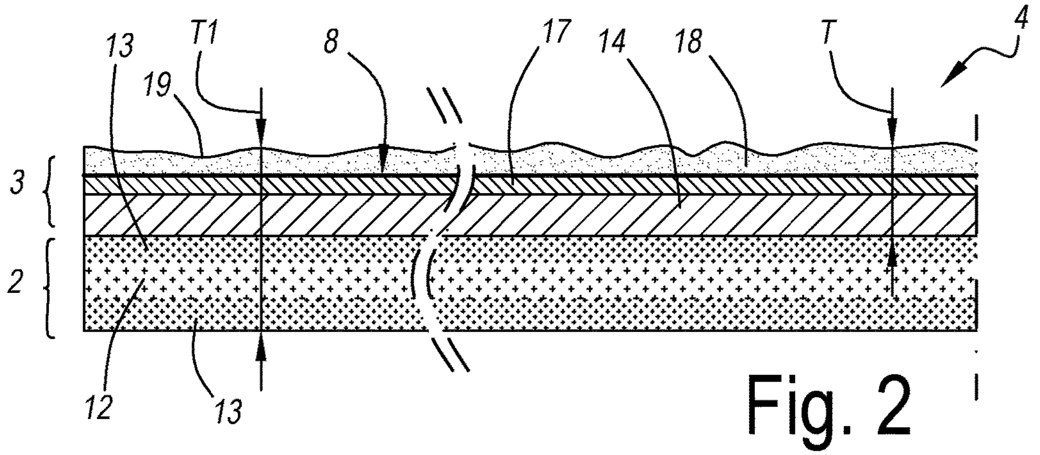
FIG. 2 at a larger scale shows a cross-section in accordance with line II-II indicated on FIG. 1.
Figure 3:
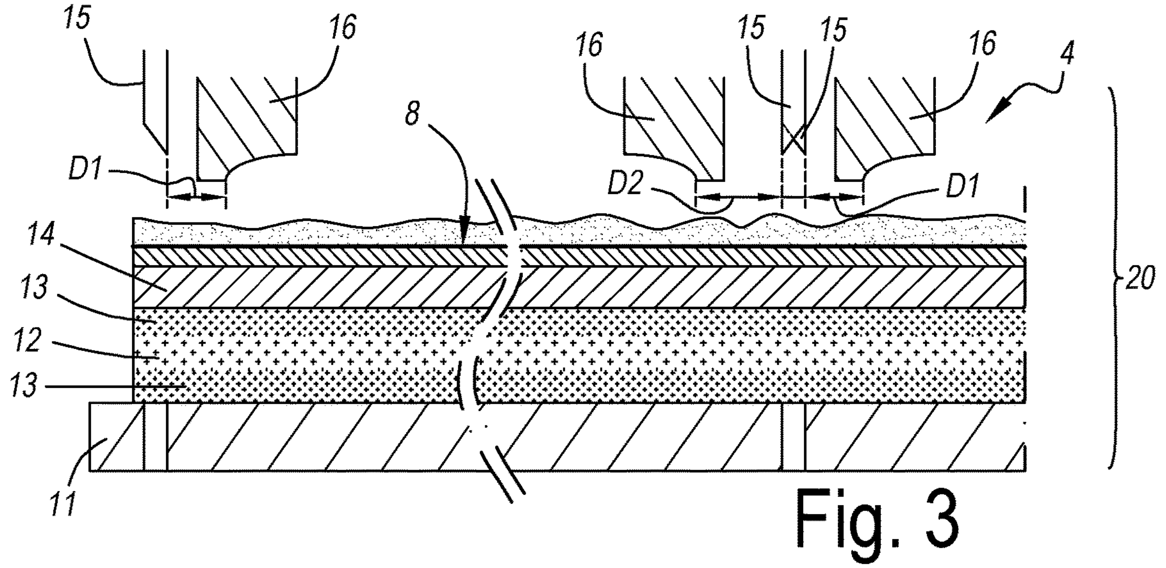
FIG. 3 at a larger scale shows a cross-section in accordance with line III-III indicated on FIG. 1.
Figure 4:
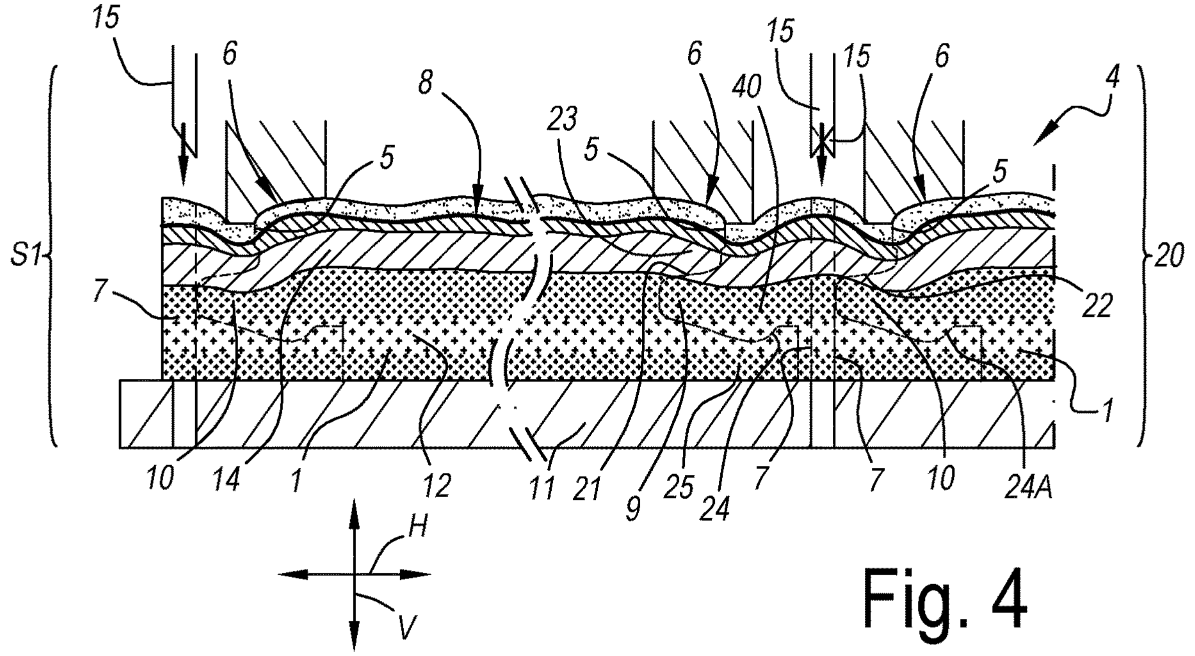
FIG. 4 in a same view as FIG. 3 illustrates the method at a different point in time.

As shown in FIGS. 2 to 4, said panel 1 comprises a substrate 2 and a decorative top layer 3, wherein said substrate is a thermoplastic material containing substrate, wherein said substrate and decorative top layer is obtained from a larger material 4 by means of a dividing operation S1, with as a characteristic that said panel 1 comprises at both upper edges 5 of a pair of opposite side edges a lower edge area 6, wherein said lower edge area 6 is obtained prior to or during said dividing operation S1.

Said dividing operation S1 comprises performing a cutting operation releasing at least said substrate 2 of said panel 1 from said larger material 4 at least two opposite edges.

The cutting operation forms opposite cut edges 7 for releasing said at least two opposite edges, wherein said opposite cut edges 7 are positioned at a mutually different distance D1-D2 from said upper edges 5 of said panel 1. The distance D2 at the upper edge 5 where the panel will be provided with a groove 9 is larger than the distance D1 at the upper edge 5 where the panel will be provided with a tongue 10. The tongue 10 and groove 9 form part of coupling means with which two of such panels can be coupled at the respective edges, such that they are locked together in a horizontal direction H perpendicular to the respective edge and in the plane of the panels 1, as well as in a vertical direction V perpendicular to the plane of the panels.

The decorative top layer 3, preferably at least the printed pattern 8 thereof, continues uninterruptedly from on the global upper surface of said panel 1 to and over said lower edge area 6.

Said lower edge areas 6 at opposite upper edges 5 mutually extend to a same or substantially same depth and/or over a same or substantially a same horizontal distance, as measured perpendicularly to said upper edge 5. Said lower edge areas 6 are formed as chamfers, in this case somewhat bent chamfers.

Said lower edge areas 6 at opposite upper edges 5 may mutually extend to a same or substantially same depth, said depth being between 0.4 and 0.6 mm below the global upper surface of said panel 1. By preference, said depth may be about 0.4 or 0.5 mm.

In the example, at least two substrates and/or top layers for respective panels 1 are obtained from said larger material 4.

Said substrate 2 at the location of said lower edge area 6 is compressed or deformed. The bottom of the substrate 2 remains undeformed. In this case the bottom of the substrate 2 is supported by supporting means 11 to this aim.

Figure 11:
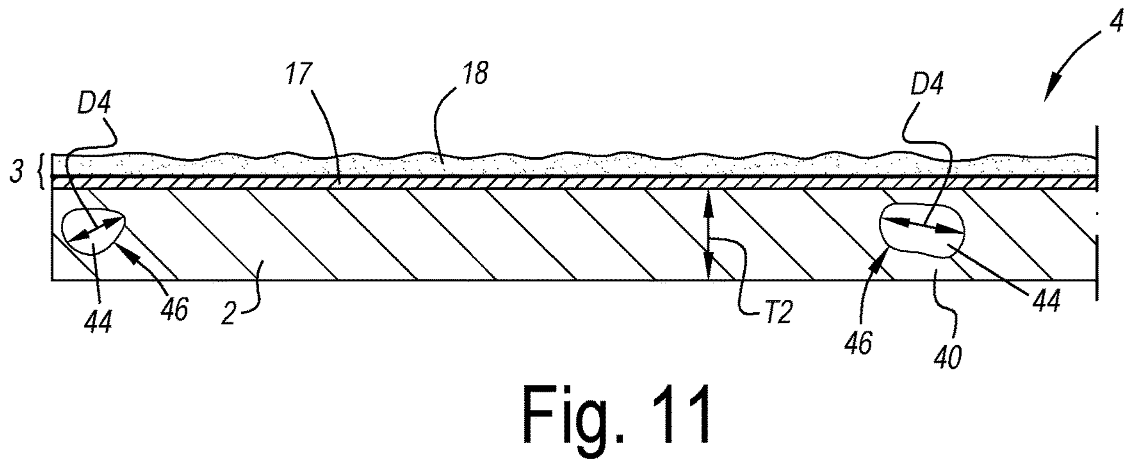

Said substrate 2 and/or decorative top layer 3 show the following properties:

- the substrate 1 comprises a foamed central material layer 12, for example a closed cell foam of a thermoplastic material such as PVC; this central material layer 12 is adjacent to a more dense, and/or less foamed, material layer 13, a so-called crust layer, both at its bottom and top surface;
- the substrate 1 comprises one or more voids, at least at a position vertically underneath said lower edge area; in this case the voids are formed by the cells of the foam, but in according with a not represented variant the void may be structural, for example a chamber formed during extrusion of the substrate 2, for example similar as further illustrated in FIG. 11.
- the decorative layer 3 comprises material having a shore hardness A lower than 80, and preferably higher than 20. In this case this material is available at least in the backing layer 14. This leads to a more fluent compression in the lower edge areas 6.

As shown, said lower edge areas 6 are formed simultaneously with, or during said dividing operation S1, such in accordance with the first possibility for forming lower edge areas mentioned in the introduction.

Preferably, as shown here, said dividing operation S1 comprises:

- providing said larger material 4 in a dividing apparatus 20;
- indenting said larger material 4 at the location of said upper edges 5 in order to at least partially form said lower edge areas 6;
- releasing said substrate 2 and said decorative top layer 3 from said larger material 4 by means of a cutting operation with a cutting tool 15, for example by means of a knife that is forced in and through said larger material 4.

Said indenting is executed by means of a mold or mold portions 16 that press down on said substrate 2 and said decorative top layer 3. Said mold or mold portions 16 are engaged with said substrate 2 and said decorative layer 3 at the start of said cutting operation, and are preferably still engaged at the end of said cutting operation. For this purpose said mold or mold portions 16 are movable with respect to said cutting tool 15. Preferably said mold or mold portions 16 are substantially at standstill during the cutting operation, i.e. while the cutting tool 15 is moved into and through said substrate 2 and decorative layer 3.

As illustrated here said dividing operation comprises a cutting operation, more particularly a punching operation, namely an operation in which a stationary, i.e. non-rotating, cutting blade or knife is pressed down to, into and through the larger material 4 to be cut.

In the example of FIGS. 1 to 4, said substrate 2 comprises at least a thermoplastic material containing board or layer, preferably a filled synthetic composite comprising thermoplastic material and filler material, preferably mineral filler materials, such as sand, talcum, chalk or other forms of $CaCO_3$. Said decorative top layer 3 comprises a motif formed by said printed pattern 8. According to an alternative a wood veneer may be used to form the motif. The printed pattern 8 is provided on a carrier layer 17 and a transparent wear layer 18 is applied on top of said printed pattern 8.

Preferably, the wear layer 18 comprises a relief 19 applied thereto or realized prior to said dividing operation S1. Said relief 19 preferably remains available in the lower edge areas 6, after the molding portions 16 are disengaged.

In the example, said decorative top layer 3 comprises from bottom to top at least a backing layer 14, a printed carrier layer 17 and a transparent wear layer 18, preferably said backing layer 14 forms the majority of the thickness T of said decorative top layer 3, or, as is the case here, at least 45 percent thereof. The substrate 2 is preferably a one piece substrate, i.e. without internal glue layers, and preferably forms the majority of the thickness T1 of the panel 1.

In the example, said backing layer 14 is a thermoplastic layer of soft PVC, namely PVC with more than 10 phr plasticizer, that also comprises filler materials.

One or more of the cutting tools 15 and/or molds or molding portions 16 may be heated, but are preferably not heated.

It is further remarked that, in the represented case of FIGS. 1 to 4, the deformation of the substrate 2 and decorative layer 3, and the positioning of the coupling means in the decorative panel 1 is such that the contact surfaces 21-22 between the top of the tongue 10 and the bottom of the upper groove lip 23 is formed in the backing layer 14, while the horizontally locking surfaces 24-24A on the lower groove lip 25 and the bottom of the tongue 10 are formed in the substrate 2.

Figure 5:
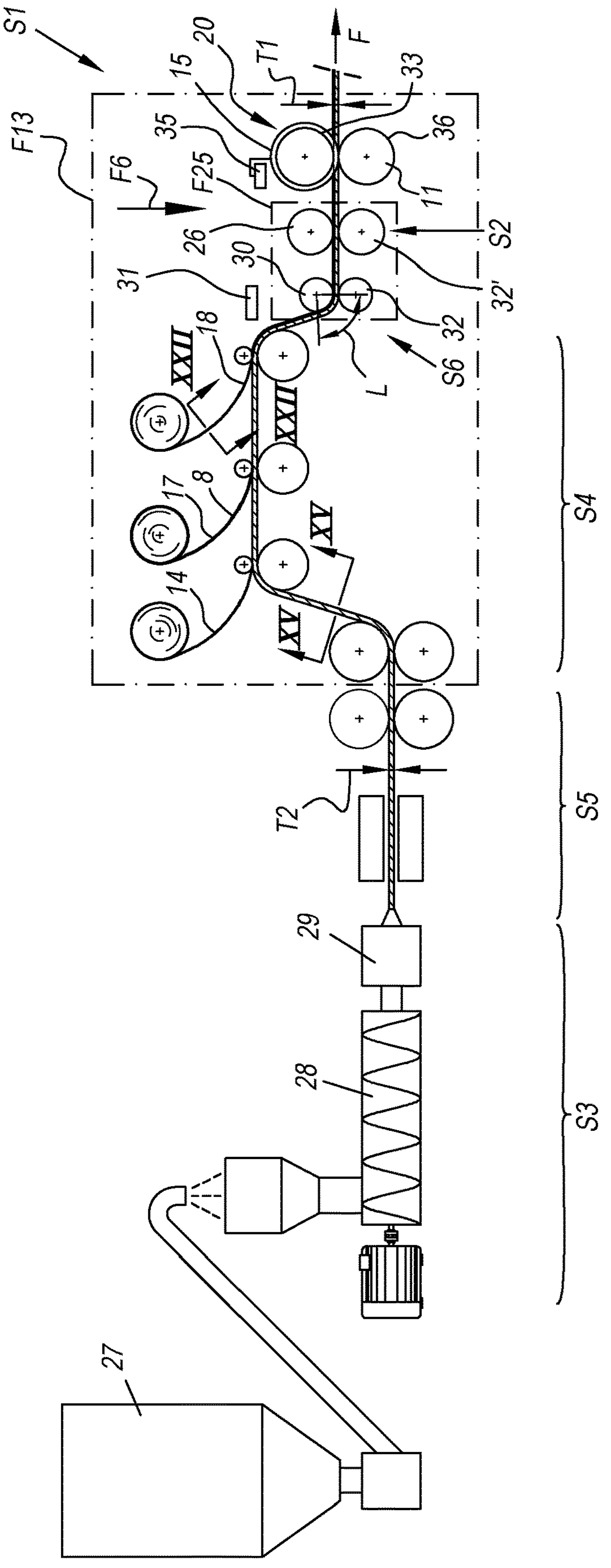
FIG. 5 schematically illustrates some steps in a further method in accordance with the invention.
Figure 6:
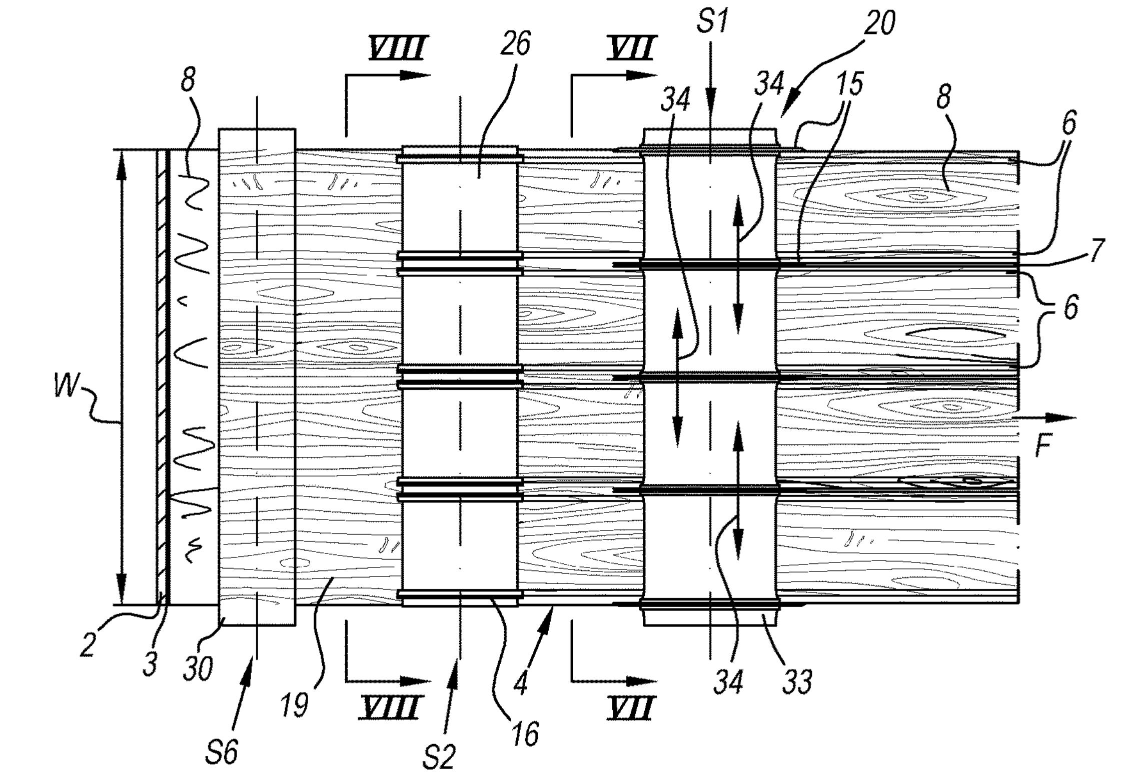
FIG. 6 represents a top view in accordance with the arrow F6 represented in FIG. 5.
Figure 7:
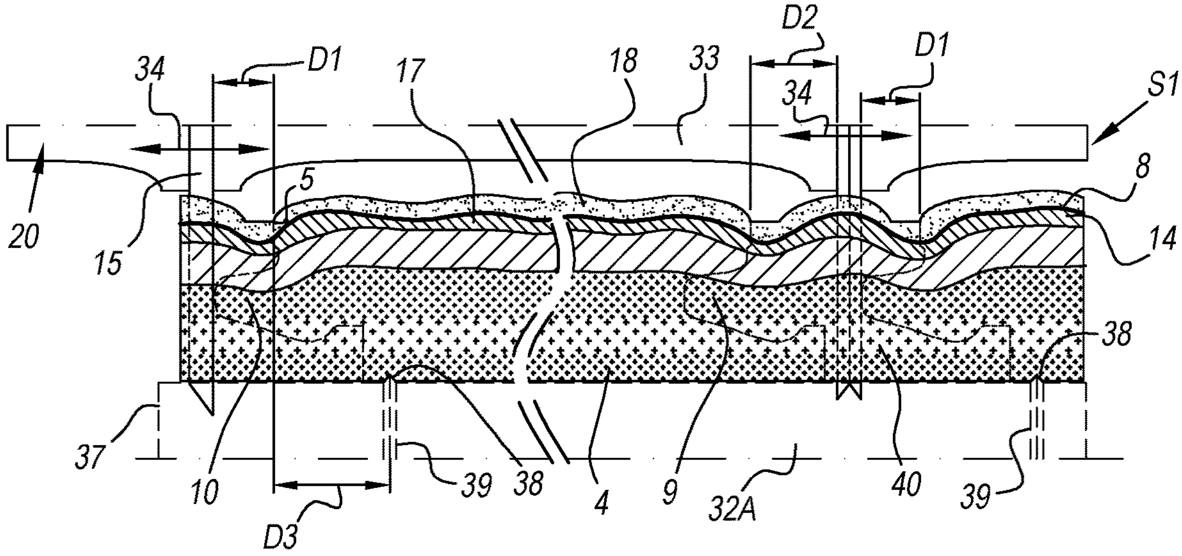
FIG. 7 at a larger scale illustrates a cross-section in accordance with the line VII-VII in FIG. 6.

FIGS. 5 to 7 represent an embodiment in accordance with the second possibility mentioned in the introduction for forming lower edge areas 6. Herein the lower edge area 6 is formed in line with, in this case prior to said cutting operation S1 that releases at least said substrate 2 from said larger material 4 at least two opposite edges. The lower edge area 6 is formed using a continuous forming operation by means of a structured roller 26. The roller 26 comprises mold portions 16 at its circumference that press down or deform the larger material 4 to create said lower edge areas 6. The roller 26 forms the lower edge area 6 while the larger material 4 is fed passed it in the feeding direction F. The forming operation S2 is arranged in line with an extrusion operation S3 and a lamination operation S4 for forming the larger material 4.

The extrusion operation S3 comprises a feed 27 for feeding raw material for the substrate 2 to the extruder 28. The raw material is extruded through a so-called flat die or slot die 29 into a flat web shaped substrate material, for example having a width W of 1 to 2.1 meter, preferably about 1.3 meter, and a thickness T2 of 2 to 7 mm, by preference of 3 to 6 mm, more by preference of 3 to 5 mm, even more by preference 3.5 to 4.5 mm, preferably about 4 mm. In the lamination operation S4 one or more of a carrier layer 17 having a printed pattern 8, a transparent wear layer 18 and a backing layer 14 may be laminated to the web shaped substrate material to form the larger material 4.

In the example, an optional thickness calibration S5 by means of one or more rollers and/or calibration plates and/or heaters and/or coolers may be performed on the extruded material.

In the example, prior to said forming operation S2, a relief 19 is formed at least in said transparent wear layer 18 in an embossing operation S6. As illustrated here, the printed pattern 8 represents a wood pattern and the relief 19 comprises indentations representing wood pores and/or wood grain lines. The indentations may be performed in accordance with the printed pattern 8, to create a so-called embossing-in-register, and a true to nature look of the panels 1. It is of course not excluded that other printed patterns 8 are used, such as stone or fantasy patterns, wherein, in such case, also corresponding indentations can be applied, whether or not in register with the printed pattern 8.

As shown in FIGS. 5 and 6 the relief 19 is formed by means of an embossing roller 30.

Prior to said embossing operation S6 and/or prior to said deforming operation S2 the larger material 4, in particular the decorative top layer 3 may be heated, for example by means of infrared or near-infrared radiators 31. In some embodiments, the larger material 4 may be heated to a temperature of between 160 and 190° C., by preference of between 170 and 190° C., more by preference of between 175 and 185° C. In a particular embodiment, the larger material 4 may be heated to a temperature of about 180° C.

Whether or not in combination with such heating, the rollers 30 and/or 26 may be cooled, or at least not heated by any other means than the possibly still hot larger material 4 and/or decorative top layer 3.

It is however also possible that the roller 30 and/or 26 are heated by other means than the possibly still hot larger material 4 and/or decorative top layer 3, for example by means of thermic oil at a temperature above 40° ° C., or above 65° C. In such case, a prior heating of the larger material 4, or in particular the decorative top layer 3, may be unnecessary.

Especially in the case of using a heated roller 30 and/or a heated roller 26 it is preferred that the larger material 4 follows a bent path around the respective roller 30-26 for an arc length L corresponding to at least 10°. Such is illustrated here in case of the embossing roller 30, where the larger material 4 follows a bent path around the embossing roller for an arc length L corresponding to about 90°.

It is to be noted that at least the embossing roller 30 and/or the structured roller 26 that forms the lowered edge areas 6 is preferably paired with at least one counter roller 32-32'. Preferably, said at least one counter roller 32-32' has a rubber surface or mantle and/or has a surface or mantle with a shore hardness A lower than 80 at 23 degrees Celsius, and even better between 60 and 80 at 23 degrees Celsius. According to a preferred embodiment, said at least one counter roller has a rubber surface and/or has a surface with a shore hardness A of about 80 at 23 degrees Celsius.

The cutting operation S1 is performed by means of a plurality of rotating cutting tools 15. In this case the cutting tools 15 are comprised on a cutting roller 33. It is clear that the cutting operation S1 shown here released the substrate 2 from the larger material only at one pair of opposite edges. The cutting operation S1 is more particularly configured to form one or more cut edges 7 in the feeding direction F of the larger material 4.

The cutting tools 15 are positioned to form opposite cut edges 7 at fixed distances D1-D2 from the upper edges 5 of said decorative panel 1. The position of the cutting tools 15 may be controllable or controlled on the basis of an upstream portion of said larger material as illustrated by means of the arrows 34 and the sensor 35. The sensor may be a tactile and/or optical sensor.

A supporting means 11 is provided for the cutting tools 15 by means of the counter roller 36. The counter roller may be provided with indentations that match the position of the cutting tools 15.

As illustrated in FIG. 7 with the dashed line 37 the larger material 4 may be provided with reference portions 38, preferably prior to said dividing operation S1. In the example the reference portions 38 are formed as indentations in the bottom of said larger material 4. For the forming the counter roller 32' may be provided with protrusions 39 for indenting the bottom of the larger material 4, or a separate means may be provided for realizing excavations, e.g. indentations, in the bottom of the larger material 4.

The reference portions 38 are provided at a fixed distance D3 from an upper edge 5, and may be used in the cutting operation S1 to align one or more cutting tools 15 such that the lower edge area 6 is parallel, and preferably at predefined distance, to one or more of the cut edges 7.

As illustrated here, the reference portions 38 are provided in a part of the larger material 4 that is maintained in the finally obtained decorative panels 1. According to a variant, the reference portions 38 may be provided in the so-called technical zone 40, i.e. a part of the larger material 4 that is to be removed in subsequent operations, for example in a milling operation that forms the coupling means at the respective edges.

Figure 8:
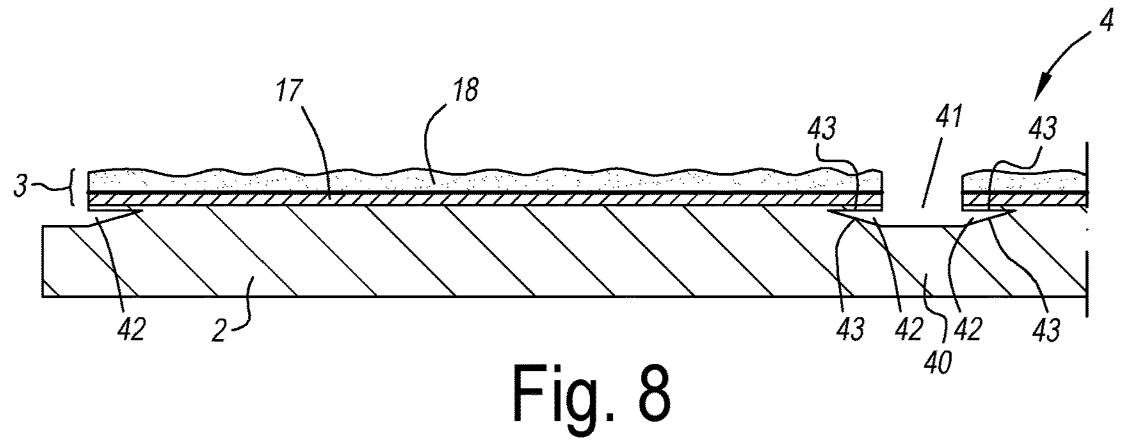
FIG. 8 at the same scale illustrates a cross-section in accordance with the line VIII-VIII in FIG. 6 for a variant.
Figure 9:
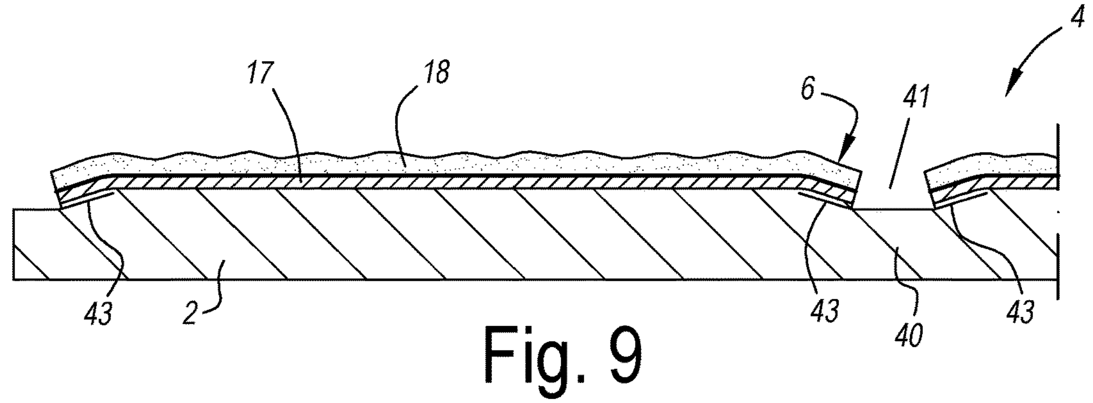
FIG. 9 shows the variant of FIG. 8 with formed lower edge areas.

FIGS. 8 and 9 illustrate a variant wherein the lowered edge area 6 is formed by indenting material at an edge of a pre-machined portion 41 of said larger material 4. The pre-machined portion 41 is performed from the top of said larger material 4, through said decorative top layer 3, into said substrate 2. In the example, the pre-machined portion 41 comprises lateral undercuts 42 vertically beneath a remaining decorative top layer portion of said larger material 4.

As shown in FIG. 9 the walls 43 of the undercuts 42 are brought closer to each other in the forming operation S2, and are potentially brought into contact. The walls 43 may adhere to each other by thermal fusion or by means of a separate glue, such as tetrahydrofuran glue, or by means of additional, e.g. powdery, substrate material added to the pre-machined portions 41. The latter is an interesting embodiment, when the substrate material comprises a thermoplastic material, such as polyvinyl chloride (PVC), polyethylene (PE), polyethylene terephthalate (PET) or polypropylene (PP), since such material can fluently be brought to create adherence between the walls 43 by means of heating and subsequent cooling, be it forced cooling or cooling at thermic conditions.

Figure 10:
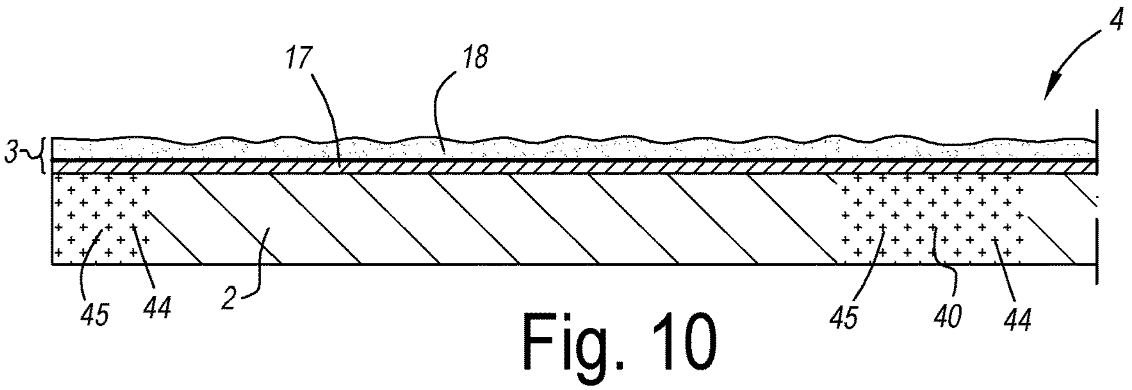
FIGS. 10 to 14 in a same view as FIG. 8 represent variants.

FIGS. 10 and 11 illustrate variants where the substrate 2 comprises voids 44 at a position vertically underneath the to be formed lowered edge area 6 or in the technical zone 40. In the case of FIG. 10, said voids are formed by the cells of a foamed material portion 45 within the substrate 2. In the case of FIG. 11, said voids are formed by chambers 46 comprised in said substrate 2. Such chambers 46 may have a maximum size D4 being at least 20 percent of the undeformed thickness T2 of the substrate 2. Both in the case of FIG. 10, as in the case of FIG. 11, the substrate 2 is otherwise formed as one or more solid material layers, in this case as a single solid material layer.

Figure 12:
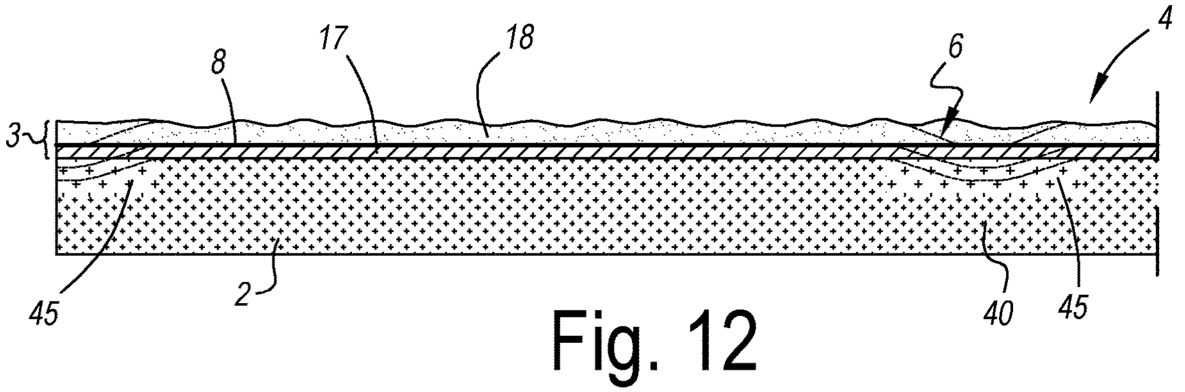

FIG. 12 illustrates another variant. In this case the substrate 2 comprises foamed material portions 45 at the location of the to be formed lower edge areas 6. More particularly, the foamed material portions 45 are in this case available at the surface of the substrate 2.

Figure 13:
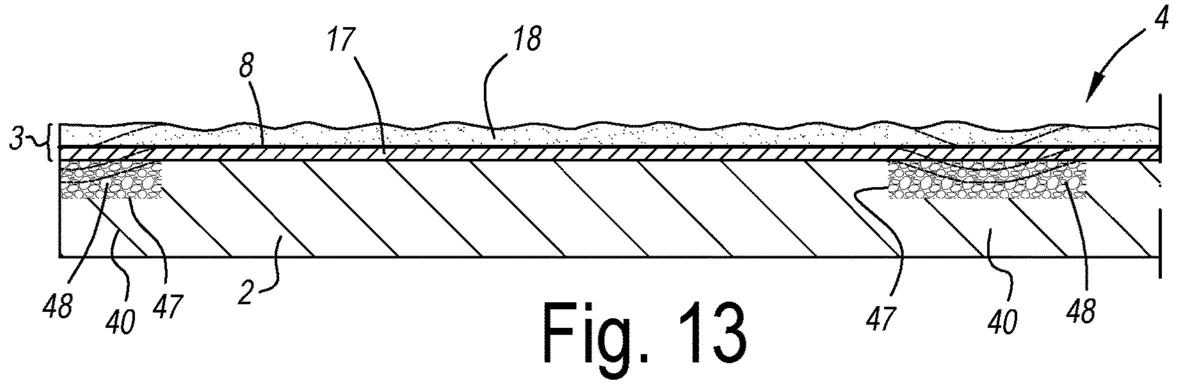

FIG. 13 illustrates another variant. In this case, the substrate 2 comprises excavations 47 at the location of the to be formed lower edge areas 6. The excavations 47 comprises powder material 48. The powder material 48 may conform to the shape of the lower edge areas 6 during the forming operation S2, for example by melting or otherwise flowing to conform to the mold portions 16. Preferably, said powder material 48 subsequently solidifies to maintain said shape. As an alternative to the powder material a material may be used that shows liquid or paste like behavior upon forming the lower edge areas. Preferably the filling material, be it a powder material 48 or another material, is of thermoplastic nature. Preferably for the filling material the same or similar material as the substrate 2 is used. In the case of a PVC containing substrate, PVC containing powder may be used, but any other thermoplastic containing powder material may serve the purpose.

Figure 14:
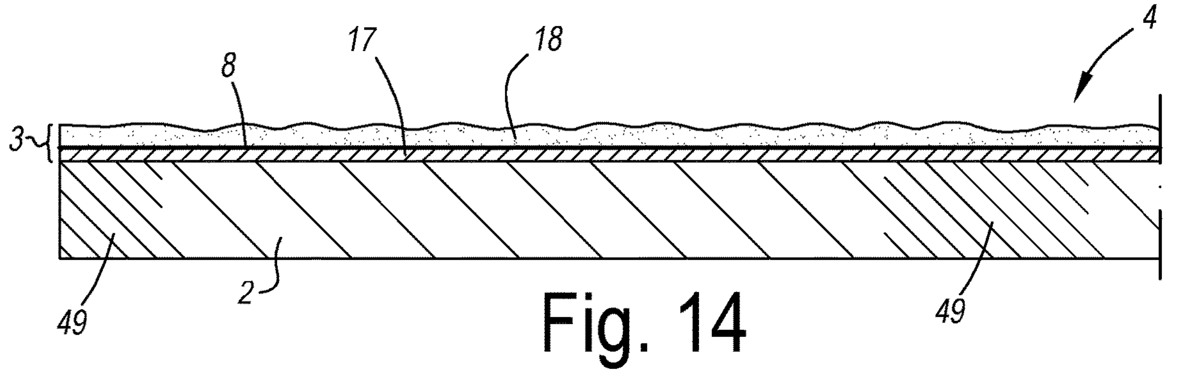

FIG. 14 illustrates another variant wherein the substrate 2 comprises zones 49 of different material composition at the location where the lower edge areas 6 are to be formed. In this case the zones 49 extend from the bottom to the top of the respective material layer. In this case, the substrate 2 is formed as a single material layer, and the zones 49 extend from the bottom to the top of the substrate 2. Preferably, the material of the zones 49 shows one or a combination of two or more of the following properties:

- the property that the material of the zones 49 is foamed;
- the property that the material of the zones 49 is foamed to a higher extent than the material of the substrate 2 or the respective material layer outside said zones 49. Potentially the material of the substrate 2 or the respective material layer outside said zones 49 is unfoamed;
- the property that the material of the zones 49 has a lower density than the material of the substrate 2 or the respective material layer outside of said zones 49. Preferably, the average density of said zone 49 is at least 100 kg/$m^3$ lower than the average density of the material of the substrate 2 or the respective material layer outside of said zones 49;
- the property that the material of the zones 49 comprises filler, however in a weight ratio filler/thermoplastic material that is smaller than in case of the material of the substrate 2 or the respective material layer outside of said zones 49. Preferably, the weight ratio filler/thermoplastic material in said zones is below 0.8, while the weight ratio filler/thermoplastic material in the substrate 2 or the respective material layer outside of said zones is at least 1;
- the property that the material of the zones 49 comprises a plasticizer, however in a ratio as expressed by phr (parts per hundred of the resin) which is higher the in case of the material of the respective material layer or the substrate 2 outside of the zones 49. Preferably, the plasticizer content in said zones 49 is at least 5 phr higher than the plasticizer content, if any, in the substrate 2 or respective material layer outside said zones 49;
- the property that the material of the zones 49 and the material of the substrate or the respective material layer outside of the zones 49 both comprise thermoplastic material, preferably the same thermoplastic material, preferably a material chosen from the list consisting of PVC, PP, PE and PET;
- the property that the material of the zones 49 has a shore hardness A value lower than 80, and preferably lower than 20;
- the property that the material of the zones 49 has a shore hardness A which is at least 10 lower than the material of said substrate 2 or the respective material layer outside of said zones 49;
- the property that the zones 49 and the remainder of the material of the respective material layer or substrate 2 have been obtained through coextrusion.

Figure 15:
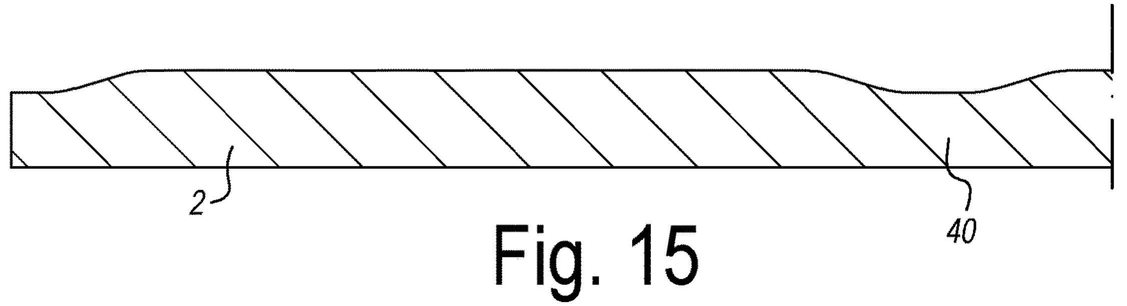
FIG. 15 at a larger scale illustrates a cross-section in accordance with the line XV-XV shown in FIG. 5, for a variant.

FIG. 15 illustrates a variant where the substrate 2, prior to the lamination step S4 has been preformed at least partially in accordance with the lower edge areas 6 to be formed. Such preforming may be obtained by using a suitable die instead of said slot die 29, or by suitably machining the extruded web shaped substrate material.

Figure 30:
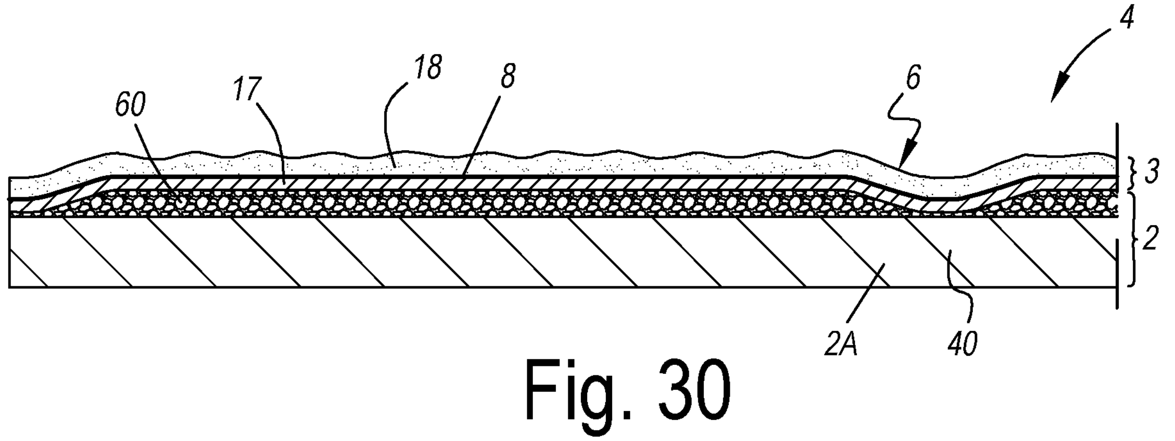
FIG. 30 at larger scale show a cross-section in accordance with the line XXX-XXX in FIG. 29.
Figure 29:
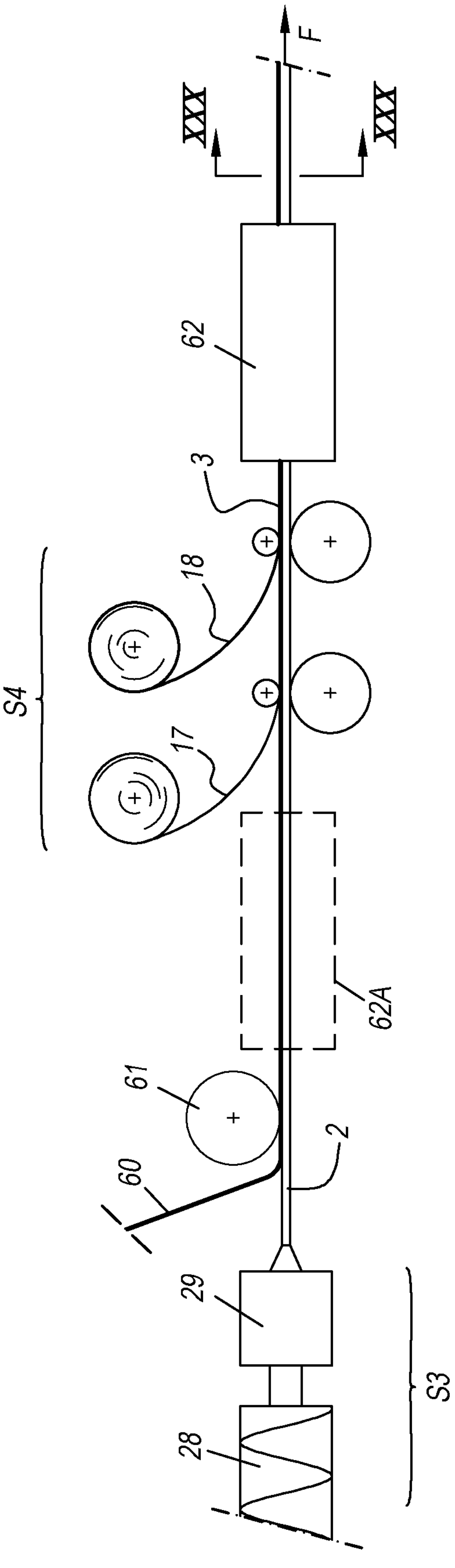
FIG. 29 schematically illustrates some steps in a further method in accordance with the invention.

Although the FIGS. 8 to 15 have been described in relation to the method illustrated by means of FIGS. 5 to 7, it is clear that pre-machined portions 41, voids, foamed material portions 45, chambers 46, zones 49, preformed substrates 2, or the use of powder material 48 may be advantageous in combination with any of the methods of the present invention, for example with the method illustrated in FIGS. 1 to 4, or with the method further illustrated in FIGS. 16 to 20, or as illustrated in FIGS. 29 to 30.

It is further remark that a substrate 2 or substrate material layer that comprises coextruded zones 49 of different composition may find broader application than solely for realizing lower edge areas 6. Such zones 49 may for example be practiced to create an increased flexibility or mechanical strength at the edges for the benefit of the quality of the coupling means to be machined therein and/or to create an increased water repellency or water resistance at these edges while keeping the material costs manageable. Therefor the present invention in accordance with a first special independent aspect also is a method for manufacturing decorative panels 1, said panels 1 at least comprising a substrate 2 and a decorative surface, wherein said method at least comprises the step of forming a material layer of said substrate 2 by means of extrusion, with as a characteristic that said material layer comprises zones 49 of a material composition that is different from the material composition of said material layer outside of said zones 49. Preferably a larger material 4 comprising said material layer is obtained from which by means of a dividing operation S1 at least the substrate 2 of said decorative panel 1 or a material layer thereof can be obtained. It is clear that the decorative surface can be formed in many ways, for example with at least a printed pattern 8, whether or not provided on a carrier layer 17, and/or a transparent wear layer 18 and/or a backing layer 14. It is further clear that said zones 49 are preferably located at one or more edges of said decorative panel 1. Preferably said zones 49 show the properties as listed above in connection to FIG. 14. It is further clear that the example substrates 2 of FIGS. 10 to 12 and 14 may be obtained through the method of the present special independent aspect. Preferably at least the lower groove lip 25 and/or that portion of the tongue 10 that extends horizontally beyond the pertaining upper edge 5 is entirely realized in such a zone 49. Preferably the zones 49 extend in a direction perpendicular to the upper edges at least over a distance that corresponds to the distance between the upper edges 5 of two to be formed panels 1 that are adjacent in the larger material 4. Preferably at least one, and preferably two edges of a pair of opposite edges of a decorative panel are entirely formed in the material of said zone 49. Preferably similar zones 49 are available at the other pair of opposite edges, in the case of a square or rectangular and oblong decorative panel 1.

It is further noted that the present invention, in an independent manner, also relates to a decorative panel 1 or a larger material suitable for dividing in decorative panels 1, wherein said panel 1 at least comprises a substrate 2 and a decorative surface, wherein said substrate 2 comprises at least one material layer, with as a characteristic that said material layer comprises zones 49 of a material composition that is different from the material composition of said material layer outside of said zones 49. The material composition of the zones 49, their size and position may further show the characteristics as described in connection to said first special independent aspect here above, without the substrate 2 necessarily comprising a material layer that has been obtained by means of extrusion. Preferably said zones 49 show the properties as listed above in connection to FIG. 14.

Figure 16:
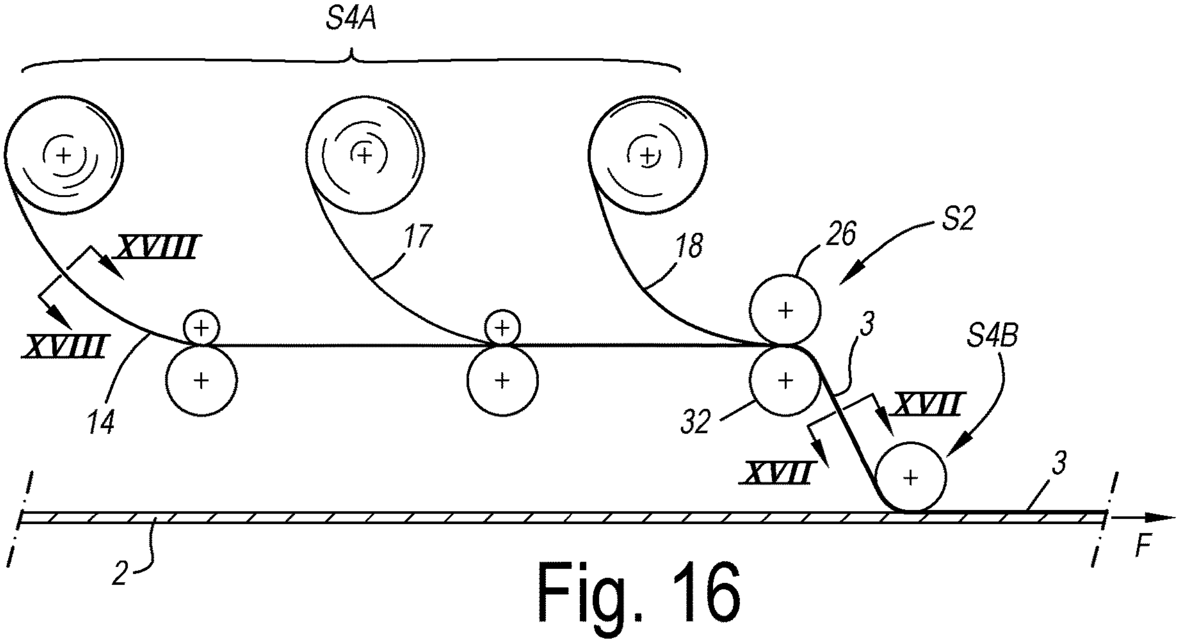
FIG. 16 schematically illustrates some steps in a further method in accordance with the invention.
Figure 17:
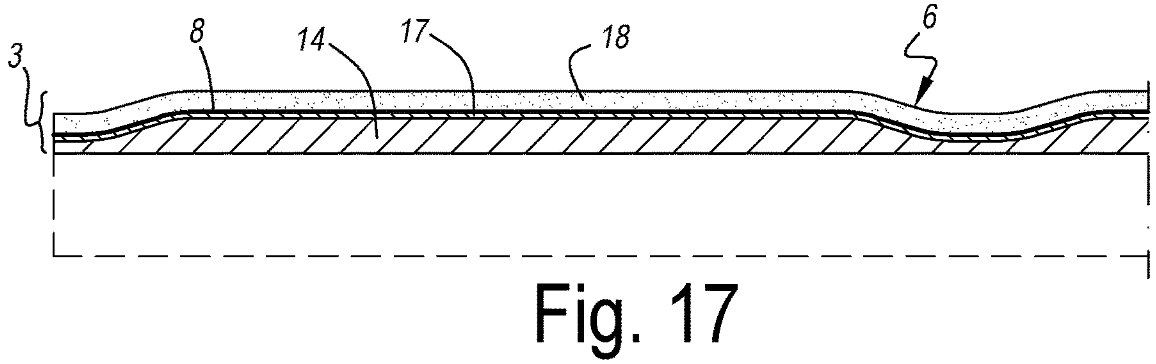
FIG. 17 at larger scale represents a cross-section in accordance with the line XVII-XVII indicated on FIG. 16.

FIG. 16 illustrates a method in accordance with the present invention. The illustrated method is a further example of said second possibility mentioned in the introduction. Herein the lower edge areas 6 are formed prior to said cutting operation S1. In particular the printed carrier layer 17, the transparent wear layer 18 and/or the backing layer 14 are laminated to form a decorative top layer 3 in a lamination operation S4A prior to laminating the obtained decorative top layer 3 to said substrate 2 in a subsequent lamination operation S4B. In said lamination operation S4A a decorative top layer 3, as shown in FIG. 17 is obtained, namely comprising lower edge areas 6 at the surface thereof having the transparent wear layer 18, while the opposite surface is maintained substantially flat or flat to allow for fluent lamination in said lamination operation S4A. In the example of FIG. 16, this is obtained through a forming operation S2 by means of a structured roller 26 indenting said decorative top layer 3 prior to said lamination operation S4B.

Figure 18:
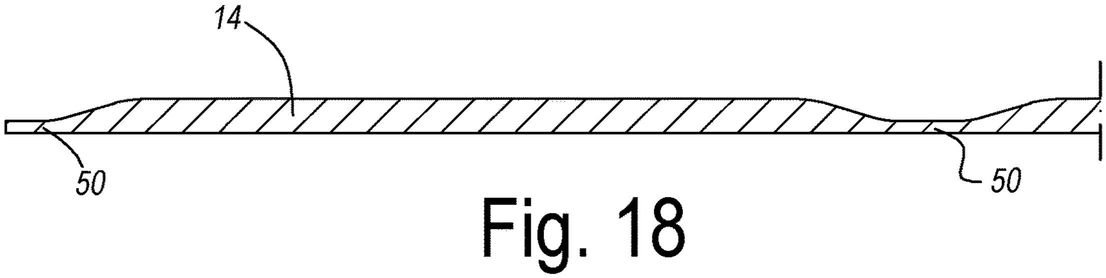
FIGS. 18 and 19 at the same scale represent, for variants, a cross-section in accordance with the line XVIII-XVIII indicated on FIG. 16.

FIG. 18 illustrates a variant where a pre-structured backing layer 14 is used. In such case the availability of the structured roller 26 may still be of interest to obtain a good lamination quality onto said pre-structured backing layer 14. The pre-structured backing layer 14 comprises thinned sections 50 at least at the location where said lower edge areas are to be obtained.

Figure 19:
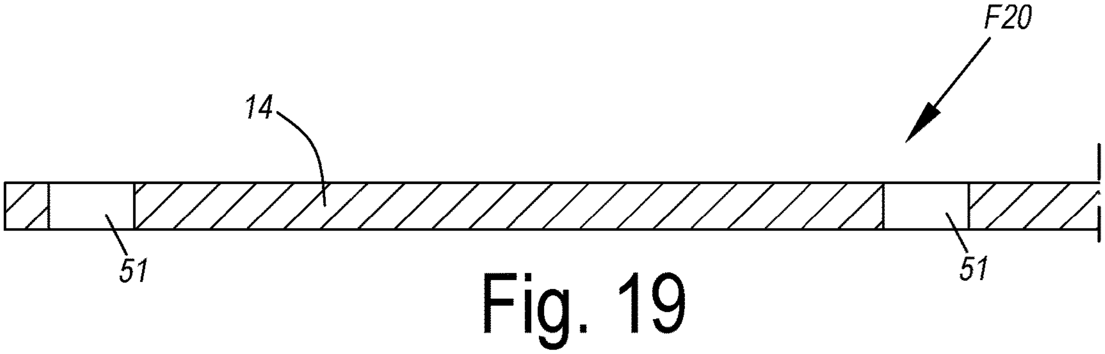
Figure 20:
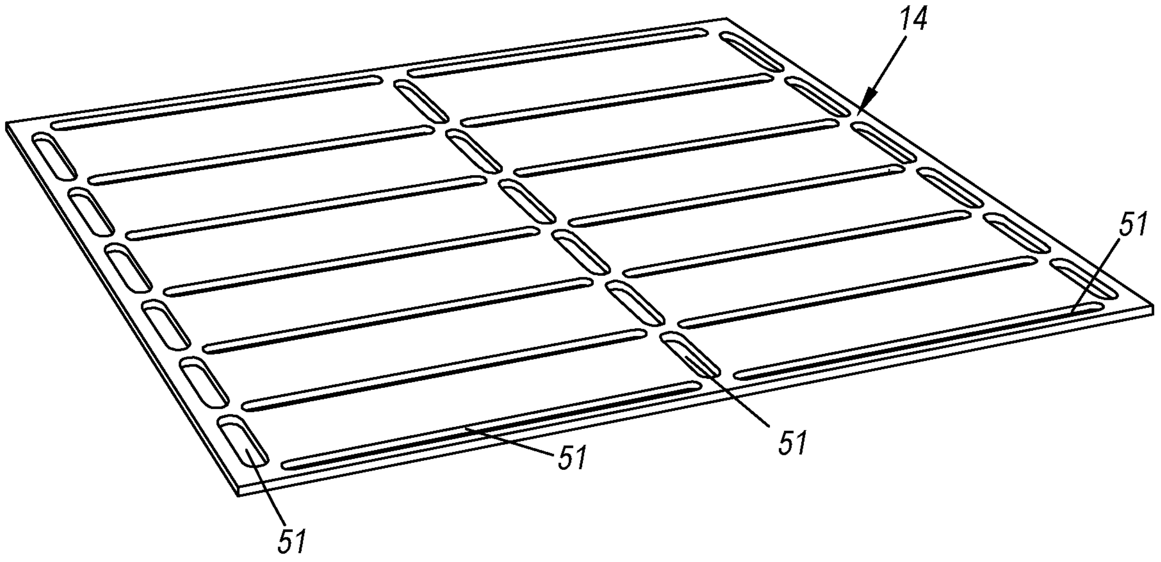
FIG. 20 shows a perspective view in accordance with the arrow F20 indicated on FIG. 19.

FIGS. 19 and 20 show a further variant where a backing layer 14 is used that comprises removed sections 51 corresponding to the lower edge areas 6 to be formed. Such embodiment is of interest to enable the formation of said lower edge areas 6 at lower power or deformation. FIG. 20 clearly illustrate that, despite the removed sections 50, the backing layer 14 remains a one-piece layer.

Regarding the variants of FIGS. 18 to 20 it is noted that these backing layers 14 with thinned sections 50 and/or removed sections 51 may be provided in a prefabricated manner from a roll, or be provided with said thinned sections 50 and/or removed sections 51 prior to and in line with said lamination operation S4A, for example immediately prior or practically immediately prior to the lamination operation S4A, or in between the unrolling and the lamination operation S4A.

Figure 21:
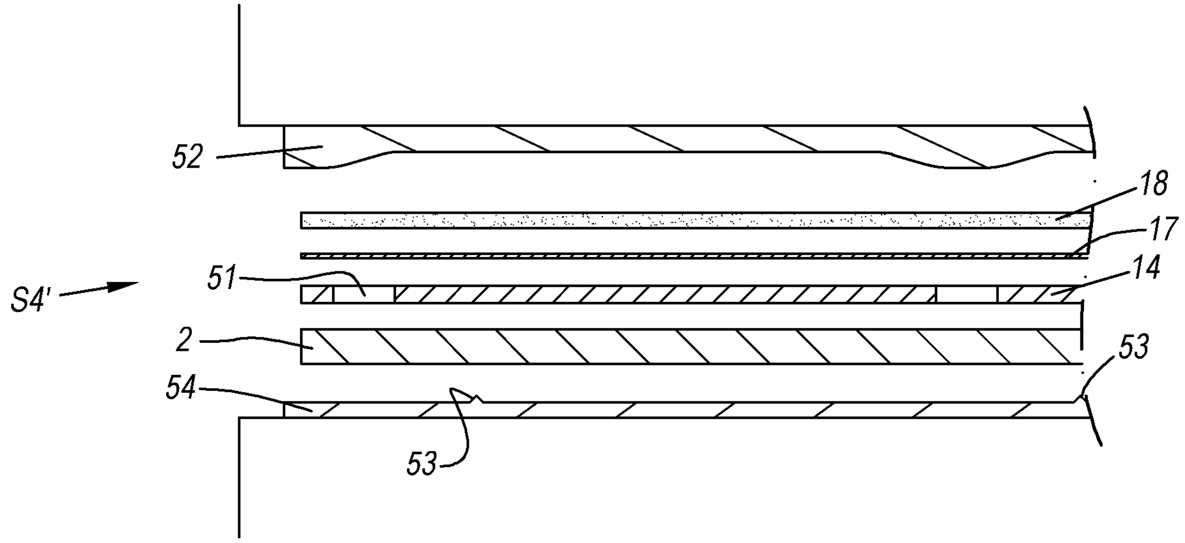
FIG. 21 schematically illustrates some steps in a further method in accordance with the invention.

FIG. 21 illustrates a method in accordance with the third possibility for forming a lowered edge area 6 mentioned in the introduction. A larger material 4 comprising a substrate 2 and a decorative top layer 3 is formed by means of a pressing operation S4' wherein a plurality of prefabricated layers 17-18-14 are adhered to each other. In this case the printed carrier layer 17, the transparent wear layer 18 and the backing layer 14 are adhered to the substrate 2 by means of said pressing operation S4'. Lower edge areas 6 are formed simultaneously with said pressing operation S4' by means of a structured press element 52 coming into contact with said decorative top layer 3 to be formed. In the example, the backing layer 14 comprises removed sections 51, similar or identical to that described in connection to FIGS. 19 and 20.

As illustrated by the dashed line 53 a bottom press plate 54 may be shaped to provide reference portions 38 in the bottom of the larger material 4. Such reference portions may be similar to those illustrated in connection to FIG. 7.

It is clear that the pressing operation S4', as illustrated in FIG. 21, makes use of a single daylight press. Of course, as a not represented alternative, a multiple daylight press may be used, wherein then several stacks composed of at least a substrate 2 and one or more layers 14-17-18 of a decorative top layer 3, are positioned on top of each other with one or more intermediate pressing elements 52, and pressed at once.

Figure 22:
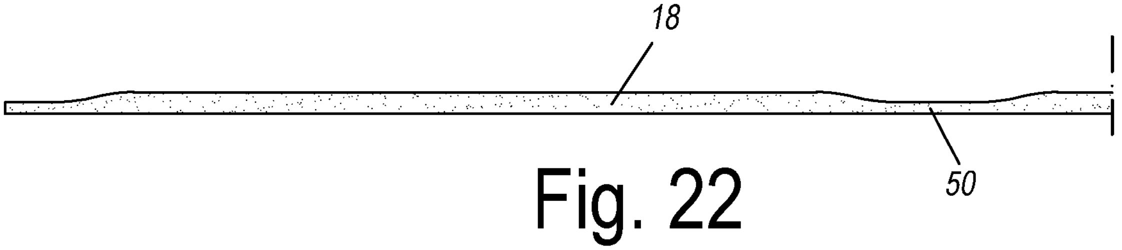
FIG. 22 in a cross-section in accordance with the line XXII-XXII indicated on FIG. 5 represents a variant.

FIG. 22 illustrates that the transparent wear layer 18 may be provided with thinned sections 50 corresponding in position to the lower edge areas 6 to be formed. Such transparent wear layer 18 may be used in combination with any of the methods described in the preceding and following figures and/or in the introduction and claims. It is clear that such transparent wear layer 18 with thinned sections 50 will at least partially accommodate a lower edge area 6 with minimized deformation. The thinned sections 50 may provide for a lower abrasion resistance at the surface of the lower edge areas 6. However, the inventors deem this of no interest, as the lowered edge areas 6 are usually so small that they cannot be walked upon, and are hence less subject to wear and abrasion.

Figure 23:
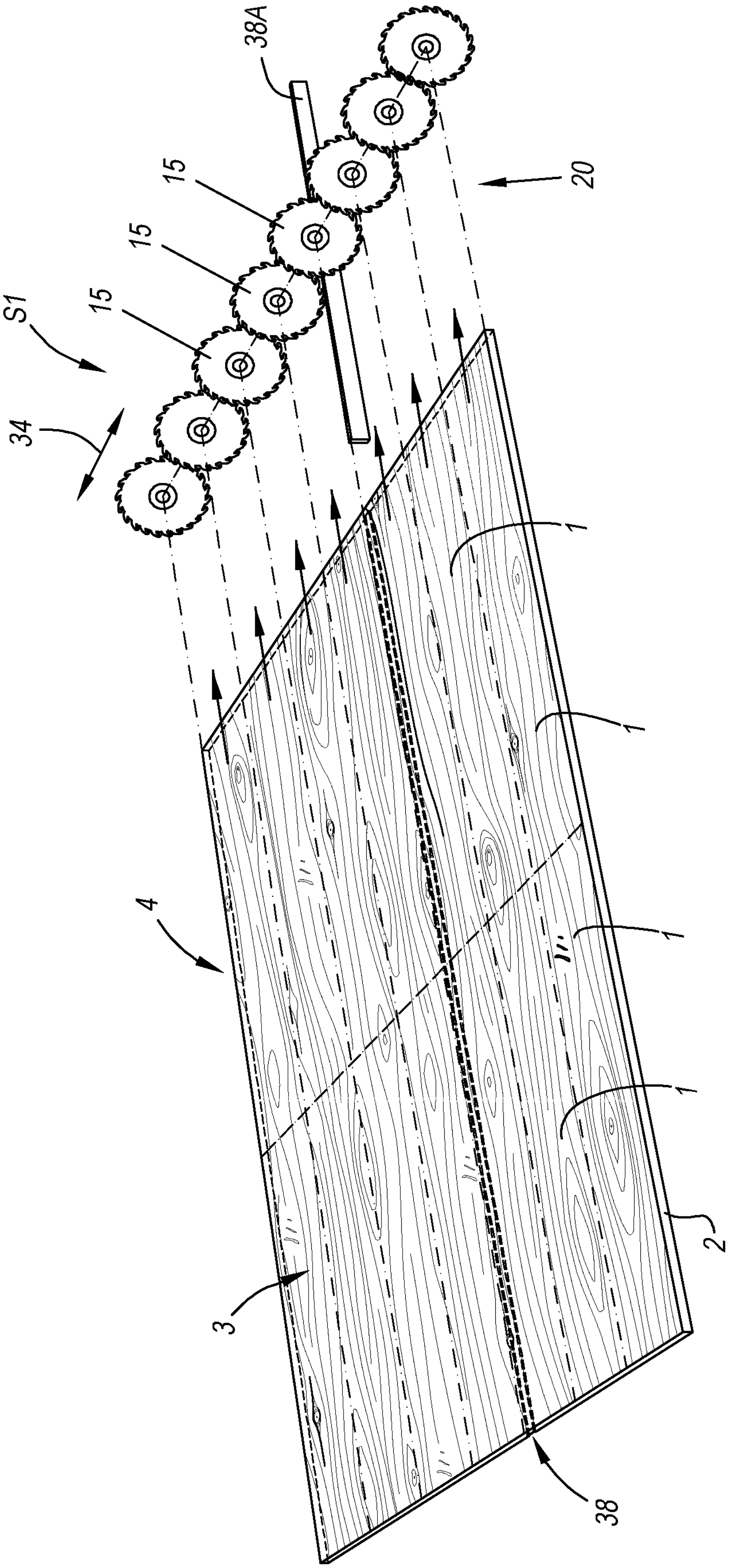
FIGS. 23 and 24 in a perspective view illustrate some alternative dividing operations.

FIG. 23 illustrates that a reference portion 38 may be used to align the larger material 4 with a dividing operation S1 or dividing apparatus 20. In the example of FIG. 20, a single reference portion 38 is used for the alignment. Herein a guiding tool 38A engages with said reference portion 38. As is the case here, such reference portion 38 is preferably available in the middle 20% of the width of the larger material 4. In so doing a possible misalignment is limited, and is expected to be largest with the outer decorative panels 1 to be divided out. It is possible however that, in accordance with a preferred embodiment, the position of the cutting tools 15 is controllable or controlled on the basis of a material portion of said larger material 4, in order to minimize potential misalignment in the width direction.

Figure 24:
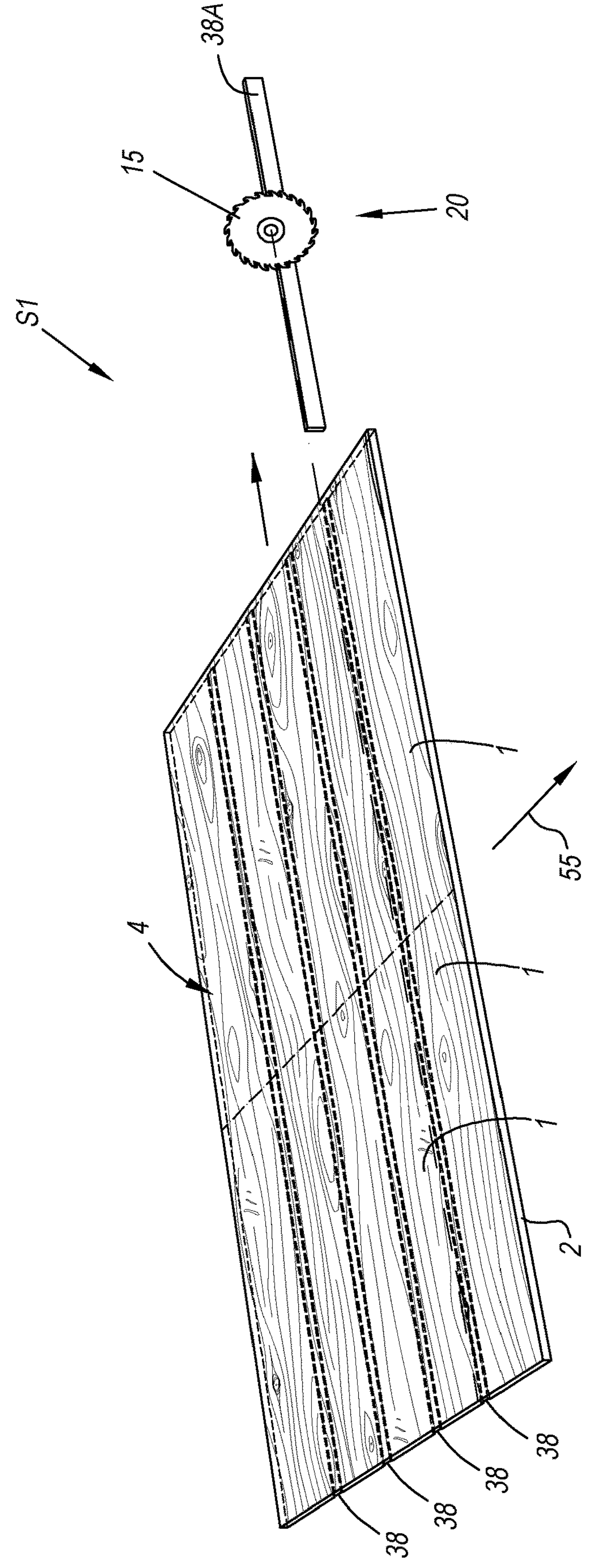

FIG. 24 illustrates an alternative wherein multiple reference portions 38 are used subsequently to divide out one decorative panel at a time and/or to perform one cut at a time. In so doing the larger material may be re-aligned multiple times using a suitable reference portion 38, preferably the reference portion 38 closest to the cut to be made. In the view of FIG. 24 after having performed a cut, the divided out decorative panel 1 can be removed, the larger material 4 shifted towards the viewer in the direction of the arrow 55 and realigned using the reference portion 38A. Afterwards a subsequent cut to divide out the next decorative panel 1 is performed.

Figure 25:
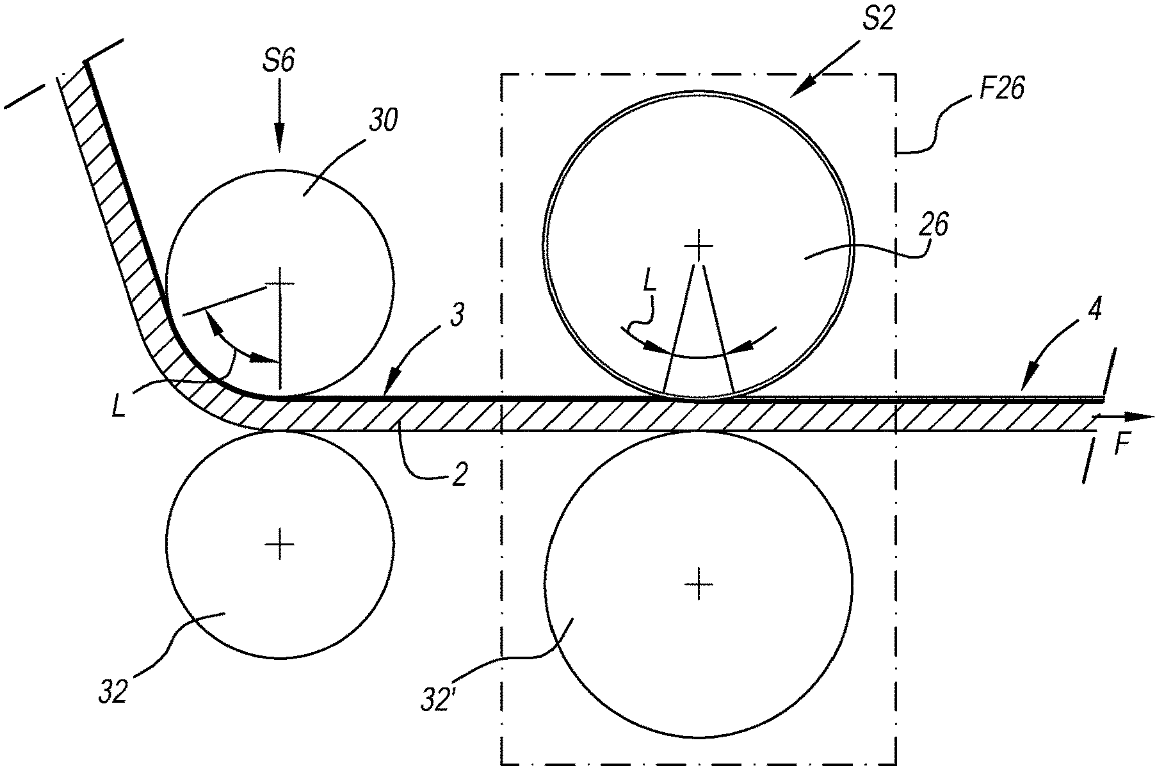
FIG. 25 represents at a larger scale the area indicated with F25 in FIG. 5.

FIG. 25 shows an enlargement of the set-up for the embossing roller 30, the structured roller 26 and counter roller 32' from FIG. 5. According to a not-represented variant, the embossing roller and the structured roller may swap positions, i.e. a method wherein the forming operation S2 is performed prior to and in line with the embossing operation S6.

Figure 26:
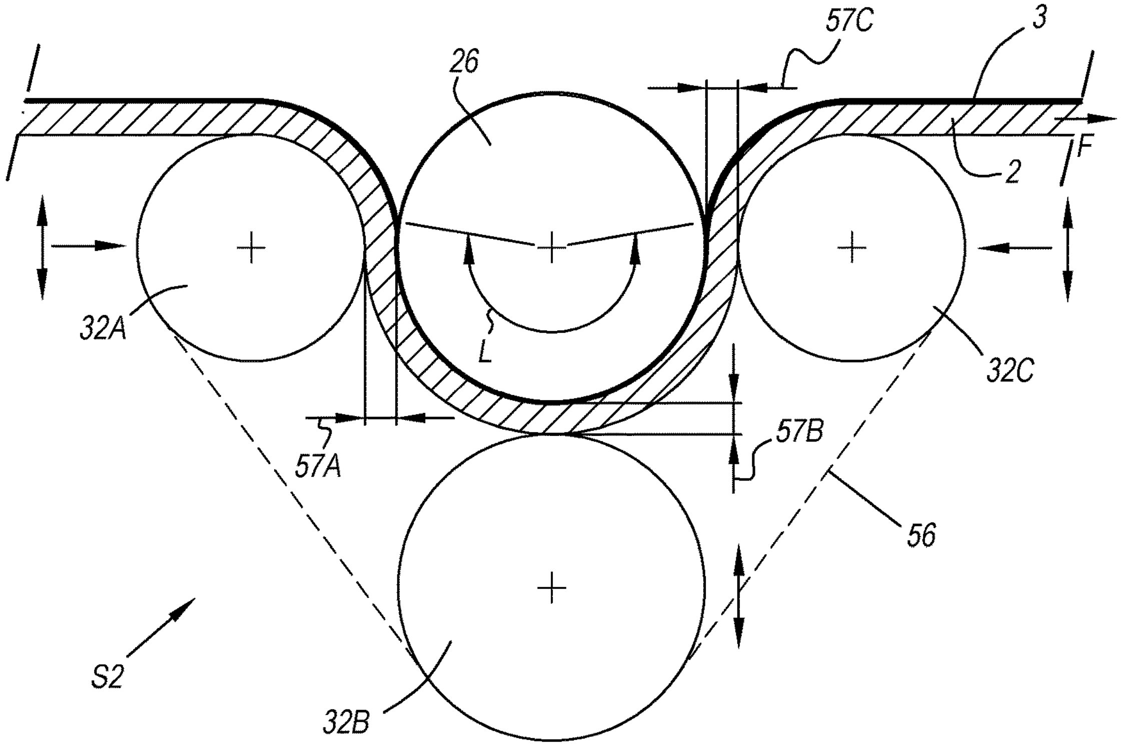
FIGS. 26 and 27 represent alternatives for the area indicated with F26 in FIG. 25.

FIG. 26 shows an alternative set-up for the forming operation S2 per se. Herein the structured roller 26 is paired with a plurality of counter rollers 32A-32B-32C, and optionally with a belt 56 provided on said counter rollers 32A-32B-32C. Herein the larger material 4 follows a bent path around the roller 26 for an arc length L corresponding to at least 100°, in this case even 180°.

Preferably, the pressure exerted on the larger material 4 at the location of the counter rollers 32A-32B-32C increases in the feed direction F. The contact at counter roller 32A is hence preferably at lower contact pressure than the contact at counter roller 32B which is in its turn preferably at lower contact pressure than the contact at counter roller 32C. According to a variant, or in combination therewith, the gap 57A-57B-57C between the counter rollers 32A-32B-32C and embossing roller 26 diminishes in the feed direction F. Thus the gap 57A at the location of counter roller 32A is preferably larger than the gap 57B at counter roller 32B which is in its turn preferably larger than the gap 57C at counter roller 32C. The pressure exerted on the larger material 4 and/or the gaps 57A-57C-57B may be adjustable by changing the position of the respective counter rollers 32A-32B-32C as shown by means of the arrows in FIG. 26.

Preferably, at least one of said plurality of counter rollers 32A-32B-32C has a rubber surface. Preferably the first counter roller 32A in feed direction F has a rubber surface. In the case a belt 56 is used, this preferably concerns a steel belt, which may be heated or not.

Preferably the structured roller 26 of the embodiment of FIG. 26 is a heated roller, for example heated by means of thermic oil or another fluid at a temperature above 40° ° C., or above 65° C. Other manners of heating the roller 26 are of course not is excluded, and it is also possible that the larger material 4 is heated prior to entering the gap between the first counter roller 32A and the structured roller 26. In such case the structured roller 26 may be cooled, or at least not heated by any other means than the possibly still hot larger material 4 and/or decorative top layer 3.

The inventors have found that pairing a structured roller 26 and/or an embossing roller 30 with a plurality, i.e. at least, two counter rollers 32A-32B leads to a better reproduction or copying of the relief of the embossing roller 30 and/or structured roller 26 into the decorative top layer 3, in particular into at least the transparent wear layer 18. The increase of the contact pressure in feeding direction F and/or the decrease of the gap 56 in feeding direction F is beneficial in moving the material of the decorative top layer 3, such as at least the material of the transparent wear layer 18, and potentially the material of the substrate 2, in the case of deep structures requiring a deformation of the substrate 2. An enhanced flow of the material of the decorative top layer 3 and/or the substrate 2 leads to a better conformity of the obtained relief to the structure on the embossing roller 30 and/or the structured roller 26 that forms the lower edge areas 6.

The findings explained above make clear that the present invention, in accordance with a second special independent aspect also is a method for manufacturing a decorative panel, or a larger material suitable to be divided into a plurality of decorative panels, wherein said panel 1 comprises a substrate 2 and a decorative top layer 3, wherein said method comprises an embossing operation S2-S6 wherein at least the decorative top layer 3 is provided with indentations, with as a characteristic that said embossing operation is performed by means of a roller 26-30 having protrusions for forming said indentations and wherein said roller 26-30 is paired with at least two counter rollers 32A-32B-32C, preferably at least three counter rollers 32A-32B-32C. In the latter case, the larger material and/or the at least two, preferably at least three, counter rollers may be heated such that the larger material and the counter rollers contact each other at a contact temperature of between 110 and 120° C., by preference of between 110 and 115° C., more by preference of about 114° C.

Preferably, in accordance with said second special independent aspect, the method further shows one or more of the following characteristics:

- said embossing operation S2-S6 is performed on said larger material 4, wherein the larger material preferably follows a bent path around the roller 26-30 for an arc length L corresponding to at least 100°, and preferably at least 150°;
- said embossing operation S2-S6 is performed on said larger material 4 and in that the pressure exerted on the larger material 4 at the location of said at least two counter rollers 32A-32B-32C increases in the feed direction F of said larger material 4;
- said embossing operation S2-S6 is performed on said larger material 4 and in that the gap 57 between said at least two counter rollers 32A-32B-32C and the roller 26-30 having said protrusions diminishes in the feed direction F of said larger material 4;
- said roller 26-30 comprising said protrusions is a heated roller, for example heated by means of thermic oil or another fluid at a temperature above 40° ° C., or above 65° C.;
- said roller 30 comprises protrusions suitable for forming indentations in the shape of a wood pore or wood grain and/or said roller 30 is applied as an embossing roller in any of the methods described in the introduction and/or in the drawings;
- said roller 26 comprises protrusions being mold portions 16 for forming lower edge areas 6 and/or said roller 26 is applied as a structured roller 26 for forming lower edge areas 6 in any of the methods described in the introduction and/or in the drawings.

It is clear that one or more of the counter rollers 32A-32B-32C may be provided with protrusions 39 for indenting the bottom of the larger material 4, similar to the protrusions 39 illustrated by means of FIG. 7. In this way reference portions 38 may be formed at a fixed distance D3 from an upper edge 5, for example for positioning the larger material 4 in the cutting operation S1.

Figure 27:
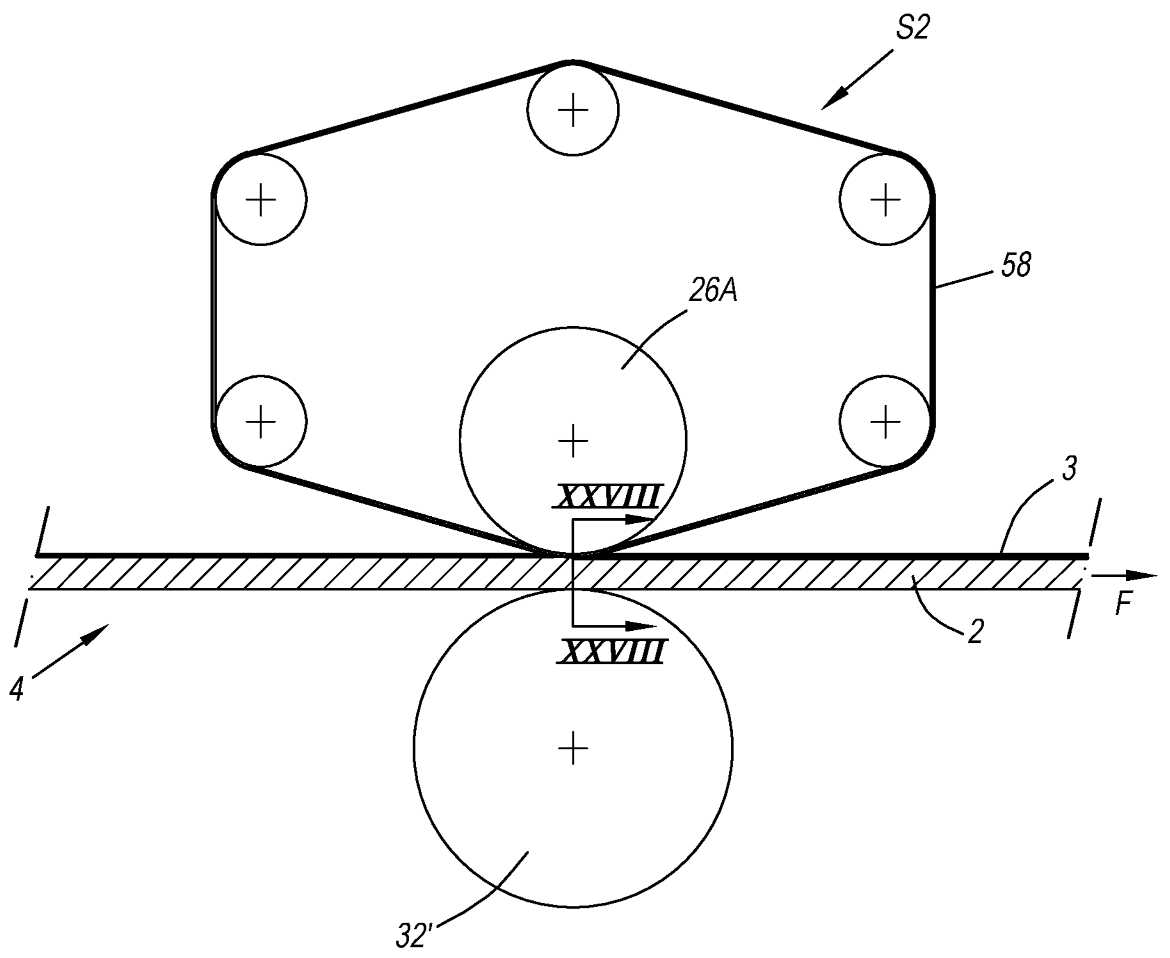
Figure 28:
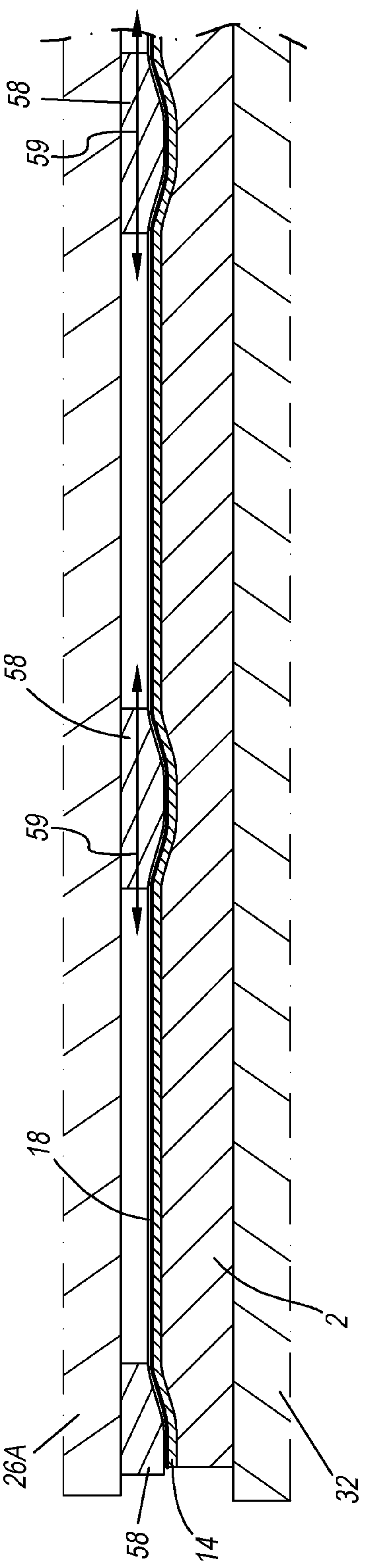
FIG. 28 shows a cross-section in accordance with line XXVIII-XXVIII shown in FIG. 27.

FIGS. 27 and 28 show an alternative for the structured roller 26 used in said forming operation S2. Herein the mold portions 16 are comprised on belts 58 which are pressed down on the decorative top layer 3 and/or the substrate 2 by means of a roller 26A. The roller 26A is paired with a counter roller 32 at the bottom of the substrate 2. The position of the belts 58 may be controlled or controllable in the transverse direction as indicated with the arrows 59, for example based on a tactile and/or optical section of an upstream portion of said decorative top layer 3.

FIG. 29 shows a further method for forming lowered edge areas 6, such in accordance with the second possibility therefor as mentioned in the introduction. Herein the lowered edge areas 6 are formed prior to the cutting operation S1.

As shown in FIG. 29, the substrate 2 is provided in a continuous manner, for example as is the case here with an extrusion operation S3. An additional foamable layer 60, for example a PVC comprising a foaming agent, such as azodicarbonamide, is applied on top of the extruded substrate layer 2A. The foamable layer 60 is then provided with a foaming inhibitor by means of a printing operation, in this case by means of the roller 61. The foaming inhibitor is applied in a pattern corresponding to areas where less foaming is desired, such as at least in positions corresponding to lower edge areas 6 to be formed.

Downstream from said roller 61, in the feeding direction F, a heat treatment, for example by means of an oven 62 is used to initiate the foaming. In the represented case the foaming takes place after the lamination step S4, and before the not represented dividing operation S1. Alternatively, the heat treatment may be executed with an oven 62A prior to said lamination operation S4. As a further alternative, the heat treatment may be executed after or simultaneously with said dividing operation S1.

FIG. 30 illustrates a cross-section of the larger material 4 obtained through the method of FIG. 29. The substrate 2, which included the extruded substrate layer 2A and the foam layer 60 is shaped in accordance with the lower edge areas 6, at least in part due to the differential foaming caused by means of the foaming inhibitor.

It is clear that according to variants, embodiments described in connection with figures showing an extrusion operation S3 may be alternatively put to practice by means of other continuous operations such as by means of one or more scattering and/or calendaring operations.

The decorative panels 1 and large materials 4 obtained through any of the methods of the invention show in themselves technical features that have inventive merit, even when they would be obtained through another method. It is therefore clear that the present invention further, in accordance with a third special independent aspect, relates to decorative panels 1 or larger materials 4 suitable for dividing in plurality of such decorative panels 1, which not necessarily are obtained through one of the afore disclosed methods, with as a characteristic that said decorative panel 1 or larger material 4 comprises a substrate 2 and a decorative top layer 3, wherein said substrate is a mineral containing substrate and/or a thermoplastic material containing substrate, wherein said panel 1 comprises at least one and preferably at both upper edges 5 of a pair of opposite side edges a lower edge area 6, wherein said decorative panel 1 or larger material 4 shows one or more of the following properties:

- the decorative panel or larger material comprises at least one reference portion 38, preferably formed as an excavation or indentation at the bottom thereof. Said reference portion 38 preferably being positioned closer to one of said upper edges 5 than to the other. Such reference portion 38 or decorative panel 1 or larger material 4 may further show the features described in connection to FIG. 7, 21, 23 or 24, or the features thereof described in the introduction without necessarily being manufactured according to the methods disclosed in these figures or introduction. In particular the positioning with respect to the upper edges 5 may be similar or identical;
- the larger material 4 comprises at least one reference portion 38 positioned within a material portion to be removed during said dividing or in the so-called technical zone 40;
- the substrate 2 comprises voids 44, chambers 46 and/or foamed material portions 45 at a location vertically beneath said lower edge area 6. Such voids 44, chambers 46 and/or foamed material portions 45 may further show the features described in connection to FIGS. 10, 11 and/or 12, and/or the features disclosed in this respect in the introduction. In particular the positioning of such voids 44, chambers 46 and/or foamed material portions 45 with respect to the upper edges 5 or lower edge areas 6 may be similar or identical without the decorative panels 1 or larger material 4 necessarily being manufactured according to the methods disclosed there;
- the substrate 2 the properties of the above paragraph, wherein said voids 44, chambers 46 and/or foamed material portions 45 are crushed and/or deformed at a location vertically beneath said lower edge area 6;
- the substrate 2 or a material layer within said substrate 2 comprises zones 49 of different material composition as compared to said substrate 2 or material layer outside of said zones 49. Preferably such zone 49 further shows one or more of the properties described in connection with FIG. 14 and/or the first special independent aspect of the invention.
- the substrate 2 comprises thinned sections 50, for example as further described in connection to FIG. 15;
- the decorative top layer 3 comprises a printed carrier layer 17 and/or a transparent wear layer 18 and/or a backing layer 14. Preferably at least one of said layers comprises thinned sections 50 and/or removed sections 51, as for example further described in connection to any of FIGS. 18 to 20 and 22;
- the decorative top layer 3 continues uninterruptedly from the global upper surface of the decorative panel onto and over said lower edge area 6;
- the substrate 2 locally comprises glue or thermoplastic material below or immediately below said lower edge are. Such embodiment may for example be obtainable through the methods described in connection to FIG. 9 or 13.

It is clear that decorative panels 1 or larger materials 4 with any of the above technical features have the advantage that they may be manufactured with fewer needed power and/or with increased accuracy and/or forming a more realistic imitation of chamfered products or other products with a lower edge area 6.

It is repeated in connection to the drawings and/or any of the above mentioned independent aspects, that said substrate 2 may comprise at least a thermoplastic material containing board or layer, preferably a filled synthetic composite comprising thermoplastic material and filler material, preferably mineral filler materials, such as sand, talcum, chalk or other forms of CaCO3.

Preferably, said decorative top layer 3 comprises a motif preferably formed by a printed pattern 8. Said decorative top layer may comprise a carrier layer 17 upon which said printed pattern 8 is provided and a transparent wear layer 18 applied on top of said printed pattern 8. Said carrier layer may be a thermoplastic foil, preferably a PVC foil, a paper layer or a wood veneer. Preferably, said wear layer 18 is a thermoplastic foil, preferably a PVC foil. In some embodiments, said decorative top layer may have a thickness of between 0.06 and 0.08 mm, by preference of about 0.07 mm. In some embodiments, said wear layer 18 may have a thickness of between 0.25 and 0.60 mm, more by preference of about 0.30 mm or about 0.55 mm. Most by preference, the thickness of the wear layer 18 is about 0.30 mm.

In accordance with some embodiments, said decorative top layer comprises a backing layer 14, wherein said backing layer preferably forms the majority of the thickness T of said decorative top layer 3, or at least 45 percent thereof. Said decorative top layer 3 may be assembled from said backing layer, printed carrier layer and wear layer by means of thermal lamination, i.e. preferably in the absence of separate glue layers in between said layers. Preferably said decorative top layer 3, or at least the bottom layer thereof, is connected to said substrate 2 by means of thermal lamination as well, i.e. in the absence of a separate glue layer. However it is not excluded that said decorative top layer 3, or at least the bottom layer thereof, is glued to said substrate 2.

Further it is remarked that using a counter roller 32-32' with a soft and/or rubber surface paired up with an embossing roller 30 or structured roller 26 for forming lowered edge areas leads to a better reproduction of the embossing roller's or structured roller's relief into the decorative top layer 3 and/or the substrate 2. This is especially the case where hot embossing is practiced, namely in the cases where the embossing roller 30 and/or the structured roller 26 is heated.

It is hence clear that the present invention, in accordance with a fourth special independent aspect is a method for manufacturing a decorative panel, or a larger material suitable to be divided into a plurality of decorative panels 1, wherein said panel 1 comprises a substrate 2 and a decorative top layer 3, wherein said method comprises an embossing operation S2-S6 wherein at least the decorative top layer 3 is provided with indentations, with as a characteristic in that said embossing operation S2-S6 is performed by means of a roller 26-30 having protrusions for forming said indentations and wherein said roller 26-30 is paired with at least one counter roller 32-32'-32A-32B-32C, said at least one counter roller having a rubber surface and/or having a surface with a shore hardness A lower than 80 at 23 degrees Celsius, and even better between 60 and 80 at 23 degrees Celsius. According to a preferred embodiment, said at least one counter roller has a rubber surface and/or has a surface with a shore hardness A of about 80 at 23 degrees Celsius. Preferably the method of the fourth special independent aspect is further characterized in that said roller 26-30 having said protrusions is a heated roller for example heated by means of thermic oil or another fluid at a temperature above 40° C., or above 65° ° C. Further the method of the fourth special independent aspect may show one or a combination of two or more of the following features:

- said roller 30 comprises protrusions suitable for forming indentations in the shape of a wood pore or wood grain;
- said roller 26 comprises protrusions being mold portions 16 for forming lower edge areas 6;
- said embossing operation S2-S6 is performed on said larger material 4 and in that the larger material 4 follows a bent path around the roller 26 for an arc length L corresponding to at least 100°, and preferably at least 150°;
- said method further shows the characteristics of the second special independent aspect and/or the preferred embodiments thereof;
- said roller having said protrusions is applied as an embossing roller 30 or a structured roller 26 in any of the methods described in the introduction or in the drawings.

Figure 31:
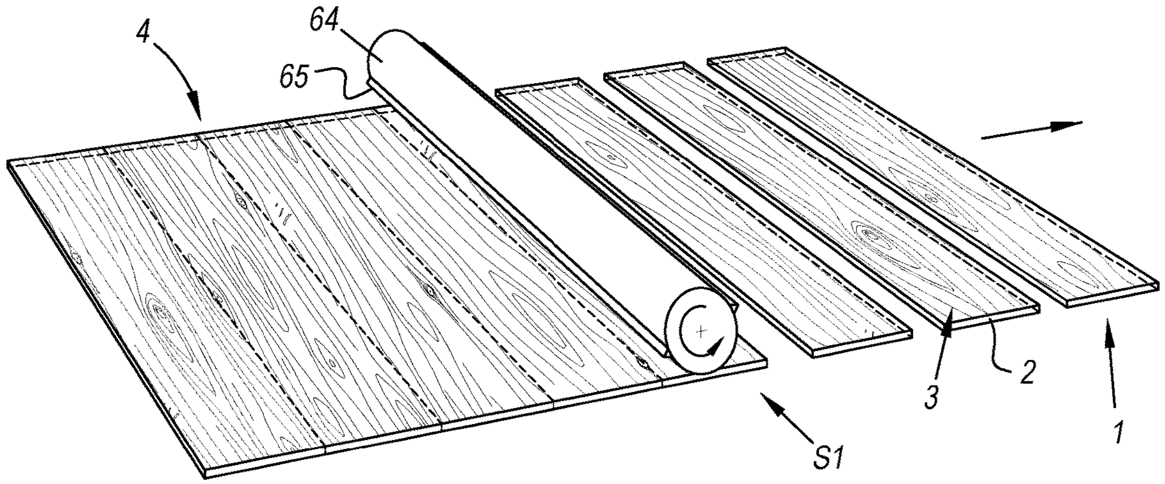
FIGS. 31 and 32 schematically illustrate some steps in a further method in accordance with the invention.
Figure 32:
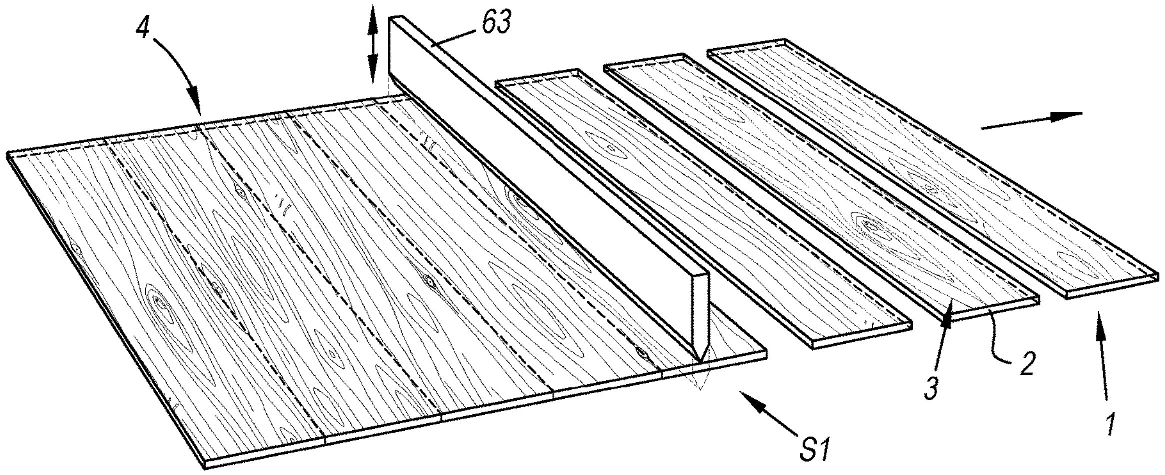

FIGS. 31 and 32 schematically illustrate a method for manufacturing a decorative panel 1, wherein said panel 1 comprises a substrate 2 and a decorative top layer 3, wherein said substrate 2 is a mineral containing substrate and/or a thermoplastic material containing substrate, wherein said substrate 2 and/or decorative top layer 3 is obtained from a larger material 4 by means of a dividing operation S1, and wherein said dividing operation S1 is performed to divide the larger material 4 into slabs comprising a single panel 1 or more than one panel 1 in a direction transversely to the feeding direction F of said larger material 4. As shown, said panel 1 optionally may comprise at least one and more by preference at both upper edges of a pair of opposite side edges a lower edge area, wherein said lower edge area is obtained prior to or during said dividing operation S1. Said dividing operation S1 may comprise performing a cutting operation releasing at least said substrate 2 from said larger material 4 at least two opposite side edges. The slabs that are formed may comprise a single panel 1 or more than one panel 1. In the latter case, said slabs comprising more than one panel 1 may be further divided into slabs comprising a single panel by means of a secondary dividing operation.

As shown in FIG. 32, said dividing operation S1 may comprise a cutting operation, more particularly a punching operation, namely an operation in which a stationary, i.e. non-rotating, cutting blade or knife 63 is pressed down to, into and through the material 4 to be cut. Alternatively in FIG. 31, said dividing operation S1 comprises a cutting operation which is non-stationary, i.e. by using a roller 64 comprising a knife-shaped protrusion 65 which is oriented transversely to the feeding direction of the larger material 4. By the rolling movement of the roller 64, the knife-shaped protrusion 65 is thus brought intermittently into engagement and disengagement with the larger material 4 in order to divide the larger material 4 into slabs comprising a single panel 1 or more than one panel 1.

Said lower edge area may be formed simultaneously with, i.e. during said dividing operation S1, or practically simultaneously with said dividing operation S1. In particular, FIGS. 31 and 32 show the dividing step S1 comprising:

- providing said larger material 4 in a dividing apparatus;
- indenting said larger material 4 at the location of said upper edges in order to at least partially form said lower edge area;
- releasing said substrate 2 and/or said decorative top layer 3 from said larger material 4 by means of a cutting operation with a cutting tool, for example by means of a cutting blade or knife 63, or by means of a roller 64 comprising a knife-shaped protrusion 65.

Said indenting may be executed by means of a mold or mold portions that press down on said substrate 2 and/or said decorative top layer 3. In particular, Said mold or mold portions may be engaged with said substrate 2 and/or said decorative layer 3 at the start of said cutting operation, and are preferably still engaged at the end of said cutting operation. With the mold or mold portions being engaged with the larger material at least during part of said cutting operation, the respective lowered edge area is formed, at least in part, simultaneously with or during the dividing operation S1.

Figure 34A:
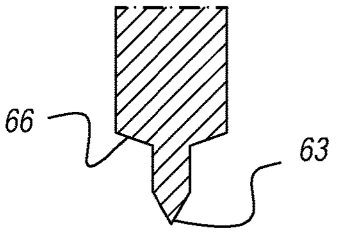
Figure 34B:
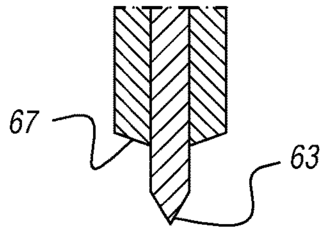

FIG. 34*a* thereto shows, in particular where the cutting tool concerns a cutting blade or knife 63, the mold or mold portions 66 may be formed together with the cutting blade or knife 63 as a singular entity. Alternatively, as shown in FIG. 34*b*, the mold or mold portions may be formed as a separate entity 67 from the cutting blade or knife 63, wherein the cutting blade or knife 63 is moveable with respect to the mold or mold portions 67. Although not explicitly shown in FIGS. 34*a* and 34*b*, the cutting blade or knife 63 and the mold or mold portions 67, either formed together or formed as a separate entity, may be configured as such to allow positioning said opposite cut edges at a mutually different distance from said upper edges of said panel.

Figure 33:
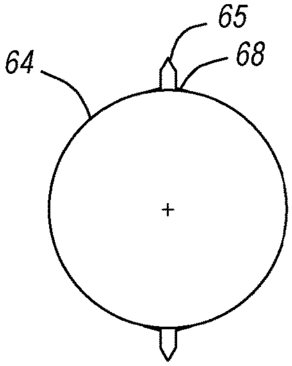
FIGS. 33, 34*a* and 34*b* illustrate various embodiments of cutting tools used in a further method in accordance with the invention.

FIG. 33 alternatively shows, where the cutting tool concerns a roller 64 comprising a knife-shaped protrusion 65, the mold or mold portions may be formed as secondary protrusions 66 on the roller 64, comprised on at least one side, preferably on two sides, of the knife-shaped protrusion 65. Although not explicitly shown in FIG. 33, the knife-shaped protrusion 65 and the secondary protrusions 66 on the roller 64, may be configured as such to allow positioning said opposite cut edges at a mutually different distance from said upper edges of said panel.

The present invention is in no way limited to the above described embodiments, but such methods, decorative panels and larger materials may be realized according to several variants without leaving the scope of the invention.

The invention claimed is:

1. A method for manufacturing a decorative panel, wherein said panel comprises a substrate and a decorative top layer, said substrate containing a thermoplastic material;

said panel comprising a pair of opposite side edges with respective upper edges associated thereto, wherein said panel comprises an upper surface and lower edge areas at said upper edges, said decorative top layer continuing uninterruptedly from on the upper surface of said panel to and over said lower edge areas;

wherein said method sequentially comprises:

a first step of providing a larger material comprising said substrate and/or decorative top layer by a continuous operation including one or more extrusion operations and lamination operations; and then a second step of forming said lower edge areas on said larger material by one or more structure rollers indenting said larger material, wherein said substrate is locally compressed or deformed at said lowered edge areas; and then a third step of dividing said larger material to obtain said substrate and/or decorative top layer.

2. The method of claim 1, wherein in said step of dividing comprises performing a cutting operation releasing at least said substrate from said larger material at at least two opposite edges.

3. The method of claim 1, wherein said step of dividing comprises a cutting operation, wherein a non-rotating, cutting blade or knife is pressed down to, into and through the material to be cut.

4. The method of claim 1, wherein said lower edge areas are formed in line with said step of dividing, wherein said step of dividing includes releasing at least said substrate from said larger material at at least two opposite edges.

5. The method of claim 1, wherein said lower edge areas are formed by indenting material at an edge of a pre-machined portion of said larger material.

6. The method of claim 1, wherein said larger material is provided with a reference portion prior to said step of dividing.

7. The method of claim 6, wherein said reference portion is used to align the larger material in said step of dividing.

8. The method of claim 7, wherein said aligning is such that the lower edge areas are parallel to one or more cuts performed in said step of dividing.

9. The method of claim 6, wherein said reference portion comprises an edge of said larger material.

10. The method of claim 6, wherein said reference portion comprises a visual or tactile marking available at a side of said larger material that comprises one of said lower edge areas.

11. The method of claim 6, wherein said reference portion is provided at a predefined distance from one of said upper edges.

12. The method of claim 6, wherein said reference portion cooperates with a stop or guiding tool in said step of dividing.

13. The method of claim 1, wherein, said lower edge areas at said upper edges mutually extend to a same depth and/or over a same horizontal distance, as measured perpendicularly to the respective upper edges.

14. The method of claim 1, wherein said substrate comprises a foamed material layer including a closed cell foam of a thermoplastic material, and/or in that said substrate comprises material having a shore hardness A lower than 80.

15. The method of claim 1, wherein said substrate comprises at least a filled synthetic composite comprising thermoplastic material and filler material, including sand, talcum, chalk or other forms of CaCO3.

16. A method for manufacturing a decorative panel, wherein said panel comprises a substrate and a decorative top layer, wherein said substrate is a mineral containing substrate and/or a thermoplastic material containing substrate, wherein said substrate and/or decorative top layer is obtained from a larger material by a dividing operation, wherein said dividing operation comprises performing a cutting operation releasing at least said substrate from said larger material at at least a pair of two opposite edges, wherein said two opposite edges comprise respective upper edges associated thereto;

wherein said panel comprises at both respective upper edges of said pair of opposite edges a lower edge area, wherein during said dividing operation, said lower edge area is obtained while said larger material is arranged in a dividing apparatus, said dividing operation comprising at least:

providing said larger material in the dividing apparatus;

indenting said larger material at said respective upper edges in order to at least partially form said lower edge area;

releasing said substrate and/or said decorative top layer from said larger material by a knife that is forced in and through said larger material, wherein said cutting operation forms opposite cut edges for said releasing at said at least two opposite edges, wherein said opposite cut edges are positioned at a mutually different distance from said respective upper edges as measured in a horizontal direction of said panel, allowing for formation of profiled edges horizontally extending differently beyond the respective upper edges.

17. The method of claim 16, wherein said indenting is executed by a mold or mold portions that press down on said substrate and/or said decorative top layer.

18. The method of claim 17, wherein said cutting operation has a start and an end, wherein said mold or mold portions are engaged with said substrate and/or said decorative layer at the start of said cutting operation, and are still engaged at the end of said cutting operation.

19. The method of claim 18, wherein said substrate comprises a foamed material layer, including a closed cell foam of a thermoplastic material, or comprises material having a shore hardness A lower than 80.

* * * * *